(12) United States Patent
Kelekar

(10) Patent No.: US 8,728,241 B2
(45) Date of Patent: May 20, 2014

(54) COMBINATORIAL SITE-ISOLATED DEPOSITION OF THIN FILMS FROM A LIQUID SOURCE

(75) Inventor: Rajesh Kelekar, Los Altos, CA (US)

(73) Assignee: Intermolecular, Inc., San Jose, CA (US)

( * ) Notice: Subject to any disclaimer, the term of this patent is extended or adjusted under 35 U.S.C. 154(b) by 674 days.

(21) Appl. No.: 12/963,237

(22) Filed: Dec. 8, 2010

(65) Prior Publication Data

US 2012/0148742 A1 Jun. 14, 2012

(51) Int. Cl.
| | | |
|---|---|---|
| *C23C 18/00* | (2006.01) | |
| *B01J 19/00* | (2006.01) | |
| *C23C 26/00* | (2006.01) | |

(52) U.S. Cl.
CPC ............. *B01J 19/0046* (2013.01); *C23C 18/00* (2013.01); *C23C 26/00* (2013.01); *B01J 2219/00274* (2013.01)
USPC .............. 118/719; 118/50; 118/629; 118/308

(58) Field of Classification Search
CPC .................. B01J 19/0046; B01J 2219/00274; C23C 18/00; C23C 26/00
USPC ............ 118/719, 620–629, 308, 50; 438/745; 65/60.1; 257/E21.001
See application file for complete search history.

(56) References Cited

U.S. PATENT DOCUMENTS

| | | | | |
|---|---|---|---|---|
| 4,230,744 | A | * | 10/1980 | Blankenship .................... 65/413 |
| 6,116,184 | A | | 9/2000 | Solayappan et al. |
| 2004/0209190 | A1 | * | 10/2004 | Mori et al. ..................... 430/311 |
| 2006/0280866 | A1 | * | 12/2006 | Marquez et al. ............ 427/248.1 |
| 2007/0231458 | A1 | * | 10/2007 | Gale et al. ..................... 427/2.11 |
| 2009/0061089 | A1 | * | 3/2009 | King et al. ............... 427/255.25 |

* cited by examiner

*Primary Examiner* — Laura Edwards

(57) ABSTRACT

An apparatus for combinatorial site-isolated thin film deposition may include a source of a liquid precursor, a nebulizer configured to convert the liquid precursor to an aerosolized mist of particles, a first deposition cell configured to direct an aerosolized mist of particles onto a first selected region of the substrate, and a second deposition cell configured to direct an aerosolized mist of particles onto a second selected region of the substrate. A method for combinatorial site-isolated thin film deposition may include providing a liquid precursor, converting the liquid precursor to an aerosolized mist of particles, transporting the aerosolized mist of particles to a first deposition cell and a second deposition cell in proximity to a surface of a substrate, and depositing the transported aerosolized mist of particles onto a first selected region and a second selected region of the surface of the substrate.

15 Claims, 18 Drawing Sheets

900

902 — PROVIDING A LIQUID PRECURSOR

904 — CONVERTING A PORTION OF THE LIQUID PRECURSOR TO AN AEROSOLIZED MIST OF PARTICLES

906 — TRANSPORTING A FIRST PORTION OF THE AEROSOLIZED MIST OF PARTICLES TO A FIRST DEPOSITION CELL CONFIGURED TO DIRECT THE FIRST PORTION OF THE AEROSOLIZED MIST OF PARTICLES TO A FIRST SELECTED REGION OF A SURFACE OF A SUBSTRATE

908 — TRANSPORTING AT LEAST ONE ADDITIONAL PORTION OF THE AEROSOLIZED MIST OF PARTICLES TO AT LEAST ONE ADDITIONAL DEPOSITION CELL CONFIGURED TO DIRECT THE AT LEAST ONE ADDITIONAL PORTION OF THE AEROSOLIZED MIST OF PARTICLES TO AT LEAST ONE ADDITIONAL SELECTED REGION OF THE SURFACE OF THE SUBSTRATE

910 — DEPOSITING A PORTION OF THE TRANSPORTED FIRST PORTION OF THE AEROSOLIZED MIST OF PARTICLES ONTO THE FIRST SELECTED REGION OF THE SURFACE OF THE SUBSTRATE

912 — DEPOSITING A PORTION OF THE TRANSPORTED AT LEAST ONE ADDITIONAL PORTION OF THE AEROSOLIZED MIST OF PARTICLES ONTO THE AT LEAST ONE ADDITIONAL SELECTED REGION OF THE SURFACE OF THE SUBSTRATE

- 1002 — PROVIDING A FIRST LIQUID PRECURSOR
- 1004 — PROVIDING AT LEAST ONE ADDITIONAL LIQUID PRECURSOR
- 1006 — CONVERTING A PORTION OF THE FIRST LIQUID PRECURSOR TO A FIRST AEROSOLIZED MIST OF PARTICLES
- 1008 — CONVERTING A PORTION OF THE AT LEAST ONE ADDITIONAL LIQUID PRECURSOR TO AT LEAST ONE ADDITIONAL AEROSOLIZED MIST OF PARTICLES
- 1010 — TRANSPORTING A PORTION OF THE FIRST AEROSOLIZED MIST OF PARTICLES TO A FIRST DEPOSITION CELL
- 1012 — TRANSPORTING A PORTION OF THE AT LEAST ONE ADDITIONAL AEROSOLIZED MIST OF PARTICLES TO AT LEAST ONE ADDITIONAL DEPOSITION CELL
- 1014 — DEPOSITING A PORTION OF THE TRANSPORTED PORTION OF THE FIRST AEROSOLIZED MIST OF PARTICLES ONTO THE FIRST SELECTED REGION OF THE SURFACE OF THE SUBSTRATE
- 1016 — DEPOSITING A PORTION OF THE TRANSPORTED PORTION OF THE AT LEAST ONE ADDITIONAL AEROSOLIZED MIST OF PARTICLES ONTO THE AT LEAST ONE ADDITIONAL SELECTED REGION OF THE SURFACE OF THE SUBSTRATE

FIG. 10

COMBINATORIAL SITE-ISOLATED DEPOSITION OF THIN FILMS FROM A LIQUID SOURCE

TECHNICAL FIELD

The present invention generally relates to thin film deposition, and more particularly to thin film deposition utilizing a system and process for mist or vapor deposition onto a substrate.

BACKGROUND

As feature sizes continue to shrink, improvements, whether in materials, unit processes, or process sequences, are continually being sought for the deposition processes. However, semiconductor companies conduct R&D on full wafer processing through the use of split lots, as the deposition systems are designed to support this processing scheme. This approach has resulted in ever escalating R&D costs and the inability to conduct extensive experimentation in a timely and cost effective manner.

As an example, integrated circuit (IC) manufacturing typically includes a series of processing steps such as cleaning, surface preparation, deposition, lithography, patterning, etching, planarization, implantation, thermal annealing, and other related unit processing steps. The precise sequencing and integration of the unit processing steps enables the formation of functional devices meeting desired performance metrics such as speed, power consumption, and reliability.

The drive towards ever increasing performance of devices or systems of devices such as in systems on a chip (SOCs) has led to a dramatic increase in the complexity of process sequence integration and device integration, or the means by which the collection of unit processing steps are performed individually and collectively in a particular sequence to yield devices with desired properties and performance. This increase in complexity of device integration has driven the need for, and the subsequent utilization of increasingly complex processing equipment with precisely sequenced process modules to collectively perform an effective unit processing step.

The ability to process uniformly across an entire monolithic substrate and/or across a series of monolithic substrates is advantageous for manufacturing cost effectiveness, repeatability and control when a desired process sequence flow for IC manufacturing has been qualified to provide devices meeting desired yield and performance specifications. However, processing the entire substrate can be disadvantageous when optimizing, qualifying, or investigating new materials, new processes, and/or new process sequence integration schemes, since the entire substrate is nominally made the same using the same material(s), process(es), and process sequence integration scheme. Conventional full wafer uniform processing results in fewer data per substrate, longer times to accumulate a wide variety of data and higher costs associated with obtaining such data. As an example, spin coating methods are severely limited in that spin coating methods typically coat an entire substrate surface with a deposition material. In another example, standard mist deposition techniques also lack the ability to provide for combinatorial processing as standard mist deposition techniques typically coat an entire substrate surface with a deposition material. As a result, the manufacture and analysis of a substrate region or structure treated with traditional spin coating or mist deposition techniques require relatively long processing times and increased processing steps. Additionally, the inability to simultaneously deposit multiple thin film regions and multiple materials on a single substrate surface inhibits the ability for comparative analysis between the various regions of a given substrate and/or substrates.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures in which:

FIG. 9 is a flow chart illustrating a method for site-isolated thin film deposition.

FIG. 10 is a flow chart illustrating a method for site-isolated thin film deposition.

DETAILED DESCRIPTION OF THE INVENTION

Figure 1A:
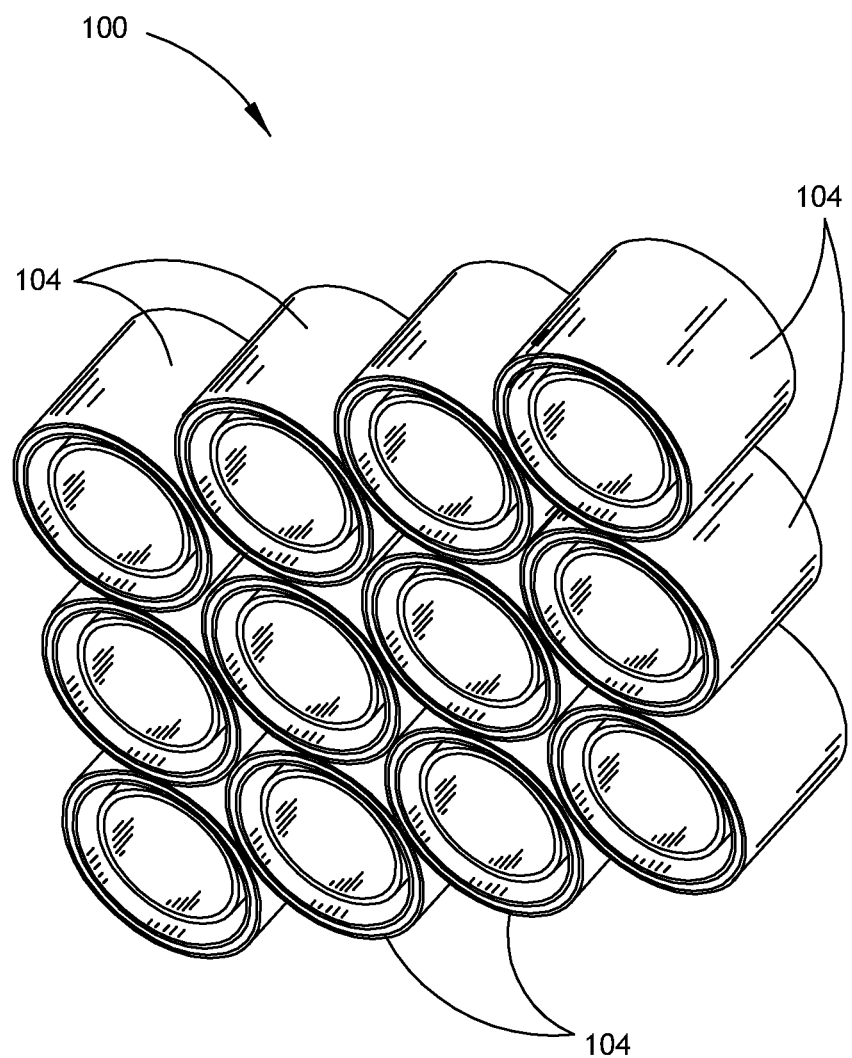
FIG. 1A is a glancing angle schematic view of a system for combinatorial site-isolated thin film deposition, in accordance with one embodiment of the present invention.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention. Reference will now be made in detail to the subject matter disclosed, which is illustrated in the accompanying drawings.

Referring generally to FIG. 1A through 8, a system 100 for combinatorial site-isolated thin film deposition is described in accordance with the present disclosure. The system 100 for combinatorial site-isolated thin film deposition may include multiple deposition cells 104 each of which are capable of isolating a selected region 108 of a substrate 104. The isolating deposition cells 104 may be utilized to deposit an aerosolized mist of particles 103 onto the selected isolated regions 108 of the surface of a substrate 114. The two or more isolating deposition cells 104 may be used combinatorially in order to deposit materials simultaneously or sequentially at two or more isolated substrate regions 108. The system 100 for combinatorial site-isolated film deposition provides for the deposition of multiple thin film materials and structures in discretized regions 108 at selected positions on the surface of a given substrate 114, such as a silicon wafer. This provides a significant advantage over other thin film deposition methods, such as spin coating methods or traditional mist deposition processes, which typically coat an entire substrate surface.

The embodiments described herein enable the application of combinatorial techniques to deposition process sequence integration in order to arrive at a globally optimal sequence of semiconductor manufacturing operations by considering interaction effects between the unit manufacturing operations on multiple regions of a substrate concurrently. Specifically, multiple process conditions may be concurrently employed to effect such unit manufacturing operations, as well as material characteristics of components utilized within the unit manufacturing operations, thereby minimizing the time required to conduct the multiple operations. A global optimum sequence order can also be derived and as part of this technique, the unit processes, unit process parameters and materials used in the unit process operations of the optimum sequence order are also considered.

The embodiments described herein are capable of analyzing a portion or sub-set of the overall deposition process sequence used to manufacture a semiconductor device. The process sequence may be one used in the manufacture of integrated circuits (IC) semiconductor devices, data storage devices, photovoltaic devices, and the like. Once the subset of the process sequence is identified for analysis, combinatorial process sequence integration testing is performed to optimize the materials, unit processes and process sequence for that portion of the overall process identified. During the processing of some embodiments described herein, the deposition may be used to form, modify, or complete structures already formed on the substrate, which structures are equivalent to the structures formed during manufacturing of substrates for production. For example, structures on semiconductor substrates may include, but are not limited to, trenches, vias, interconnect lines, capping layers, masking layers, diodes, memory elements, gate stacks, transistors, or any other series of layers or unit processes that create a structure found on semiconductor chips. The material, unit process and process sequence variations may also be used to create layers and/or unique material interfaces without creating all or part of an intended structure, which allows more basic research into properties of the resulting materials as opposed to the structures or devices created through the process steps. While the combinatorial processing varies certain materials, unit processes, or process sequences, the composition or thickness of the layers or structures or the action of the unit process is preferably substantially uniform within each region, but can vary from region to region per the combinatorial experimentation.

The result is a series of regions on the substrate that contain structures or results of unit process sequences that have been uniformly applied within that region and, as applicable, across different regions through the creation of an array of differently processed regions due to the design of experiment. This process uniformity allows comparison of the properties within and across the different regions such that the variations in test results are due to the varied parameter (e.g., materials, unit processes, unit process parameters, or process sequences) and not the lack of process uniformity. However, non-uniform processing of regions can also be used for certain experiments of types of screening. Namely, gradient processing or regional processing having non-uniformity outside of manufacturing specifications may be used in certain situations.

The term "combinatorial processing" generally refers to techniques of differentially processing multiple regions of a substrate. Combinatorial processing can be used to produce and evaluate different materials, chemicals, processes, and techniques related to semiconductor fabrication as well as build structures or determine how the above coat, fill, or interact with existing structures. Combinatorial processing varies materials, unit processes and/or process sequences across multiple regions on a substrate.

FIGS. 1A through 1D illustrate schematic views of a system 100 for combinatorial site-isolated thin film deposition in accordance with exemplary embodiments of the present invention. The system 100 for combinatorial site-isolated thin film deposition may include two or more deposition cells 104 configured to isolate two or more selected regions 108 of a substrate 104. As shown in FIG. 1A, the deposition cells 104 may be arranged in an array (e.g., hexagonal array), allowing for the precise control of the location of the isolated deposition regions 108 on a corresponding substrate 114 surface. Moreover, the system 100 may include one or more nebulizers 102 configured to aerosolize a selected amount of one or more liquid precursors 107. Further, the one or more nebulizers 102 may be in fluidic communication with the deposition cells 104, allowing for the transportation of the aerosolized mist of particles 103 from the nebulizer 102 to the deposition cells 104.

Figure 1B:
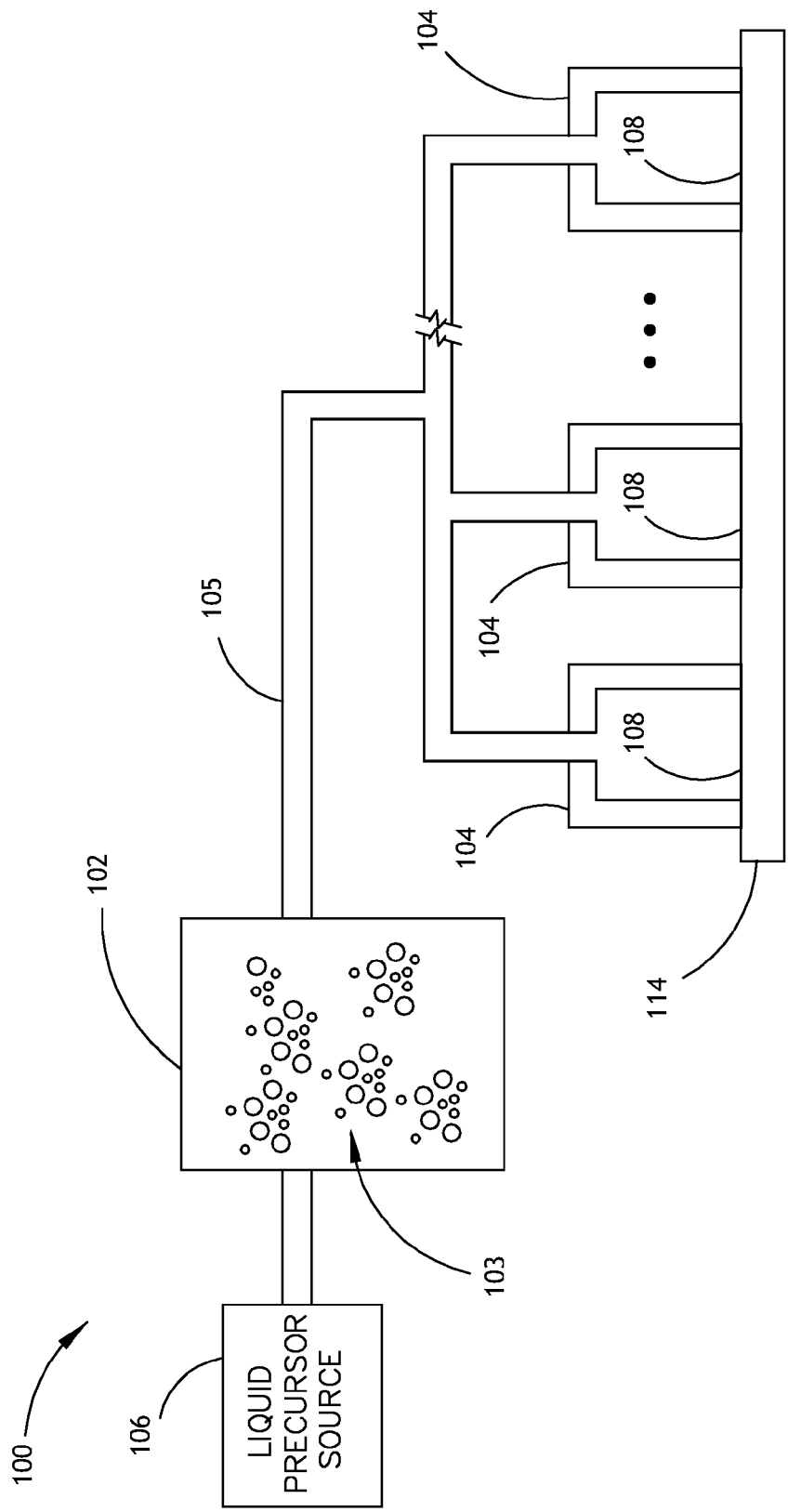
FIG. 1B is a simplified schematic view of a system for combinatorial site-isolated thin film deposition, in accordance with one embodiment of the present invention.

In one embodiment, illustrated in FIG. 1B, the system 100 may include a single nebulizer 102 fluidically coupled to two or more deposition cells 104. For example, a single liquid precursor 107 may be supplied to a nebulizer 102. The nebulizer 102 may then convert a portion of the liquid precursor 107 to an aerosolized mist 103 of particles. The aerosolized mist 103 of particles may then be transported to two or more deposition cells 104. For instance, a first portion of the aerosolized mist 103 of particles may be transported to a first deposition cell 102 configured to isolate a first region 108 of the substrate 114, a second portion of the aerosolized mist 103 of particles may be transported to a second deposition cell 104 configured to isolate a second region 108 of the substrate 114, and an Nth portion of the aerosolized mist 103 of particles may be transported to an Nth deposition cell 104 configured to isolate an Nth region 108 of the substrate 114.

Figure 1C:
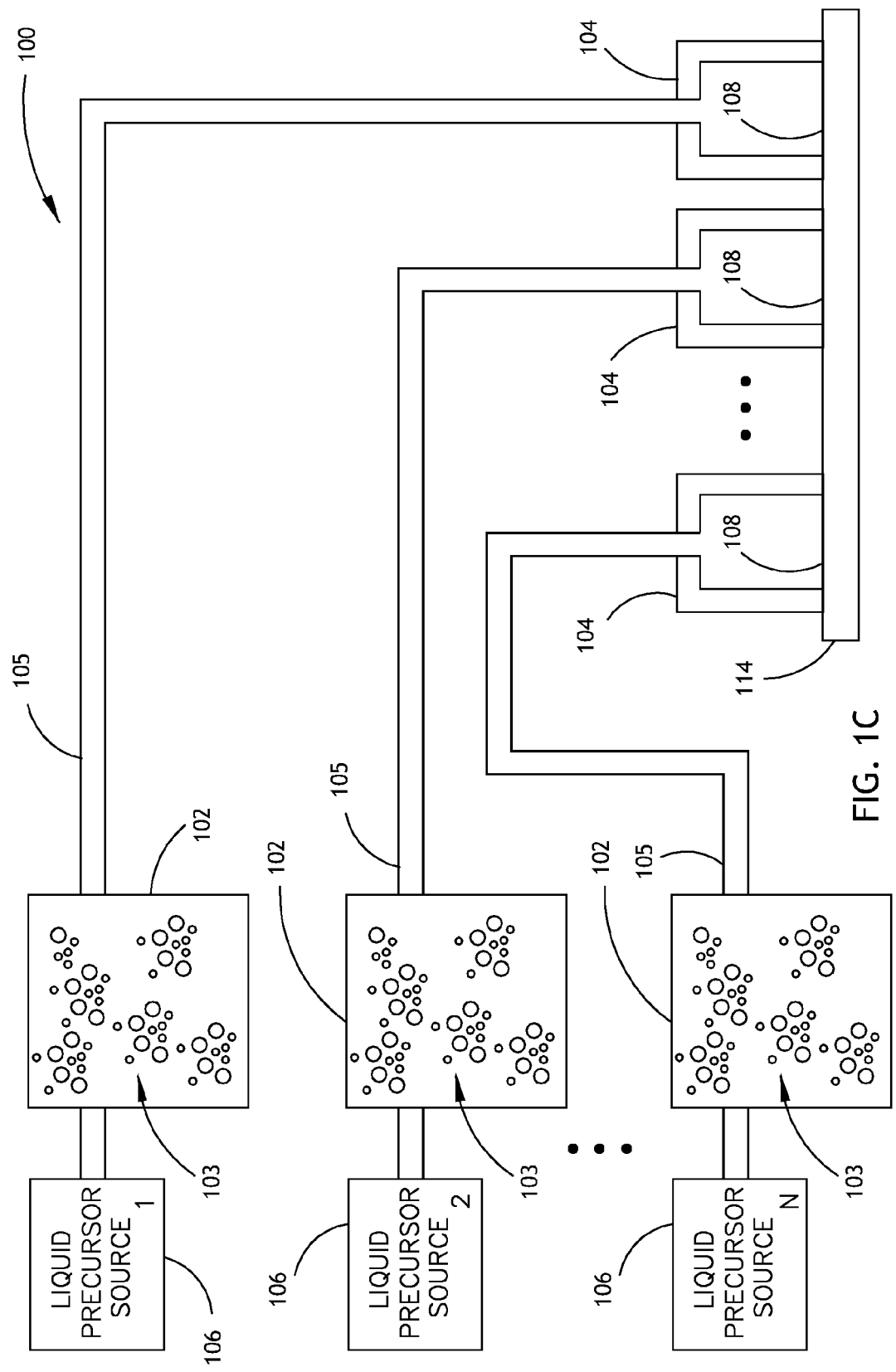
FIG. 1C is a simplified schematic view of a system for combinatorial site-isolated thin film deposition, in accordance with one embodiment of the present invention.

In another embodiment, illustrated in FIG. 1C, the system 100 may include two or more nebulizers, wherein each nebulizer 102 is fluidically coupled to a deposition cell 104. For example, a first liquid precursor 107 may be supplied to a first nebulizer 102, a second liquid precursor 107 may be supplied to a second nebulizer 102, and an Nth liquid precursor 107 may be supplied to an Nth nebulizer 102. It should be noted that the first, second, and up to and including the Nth liquid precursors 107 may be comprised of the same or different liquid precursor materials. The first nebulizer 102 may convert a portion of the first liquid precursor 107 to a first aerosolized mist 103 of particles. A portion of the first aerosolized mist 103 of particles may then be transported to a first deposition cell 102. The second nebulizer 102 may convert a portion of the second liquid precursor 107 to a second aerosolized mist 103 of particles. A portion of the second aerosolized mist 103 of particles may then be transported to a second deposition cell 102. The Nth nebulizer 102 may convert a portion of the Nth liquid precursor 107 to an Nth aerosolized mist 103 of particles. A portion of the Nth aerosolized mist 103 of particles may then be transported to the Nth deposition cell 102. For instance, the portion of the first aerosolized mist 103 of particles may be transported to a first deposition cell 102 configured to isolate a first region 108 of the substrate 114, the portion of the second aerosolized mist 103 of particles may be transported to a second deposition cell 102 configured to isolate a second region 108 of the substrate 114, and the portion of the Nth aerosolized mist 103 of particles may be transported to an Nth deposition cell 102 configured to isolate an Nth region 108 of the substrate 114.

Figure 1D:
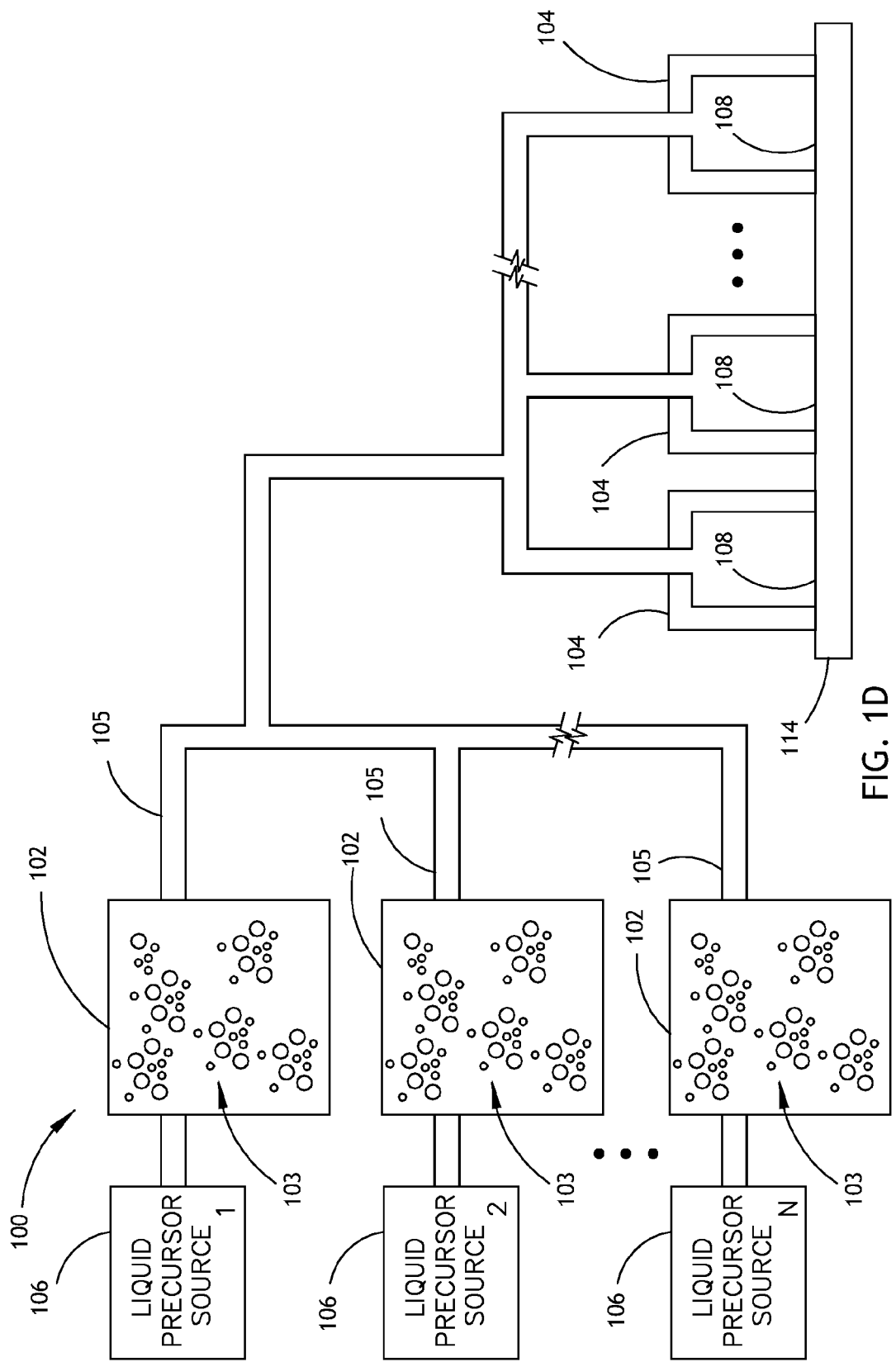
FIG. 1D is a simplified schematic view of a system for combinatorial site-isolated thin film deposition, in accordance with one embodiment of the present invention.

In another embodiment, illustrated in FIG. 1D, the system 100 may include two or more nebulizers 102, wherein the nebulizers are configured to deliver two or more liquid precursors 107 to a deposition cell 104. For instance, a first nebulizer 102 may be used to convert a first liquid precursor 107 to a first aerosolized mist of particles 103 and a second nebulizer 102 may be used to convert a second liquid precursor 107 to a second aerosolized mist of particles 103. Generally, up to an including an Nth nebulizer may be used to convert an Nth liquid precursor 107 to an Nth aerosolized mist of particles 103. Then, the first mist of particles 103, the second mist of particles 103, and up to and including the Nth mist of particles 103 may be intermixed. For instance, a first and second mist of particles may be mixed within a nebulizer-cell conduit 105 as the particles are transported to one or more deposition cells 104. In another instance, a first mist of particles 103 and a second mist of particles 103 may be mixed in an associated mixing chamber. The mixed mist of particles may then be supplied to one or more deposition cells 104 as described in the present disclosure. The preceding description should not be interpreted as a limitation but rather merely an illustration of combinatorial processing techniques which may be implemented with the presently disclosed system and methods as it is contemplated that a variety of implementations may be more or less suitable in different contexts.

Figure 1E:
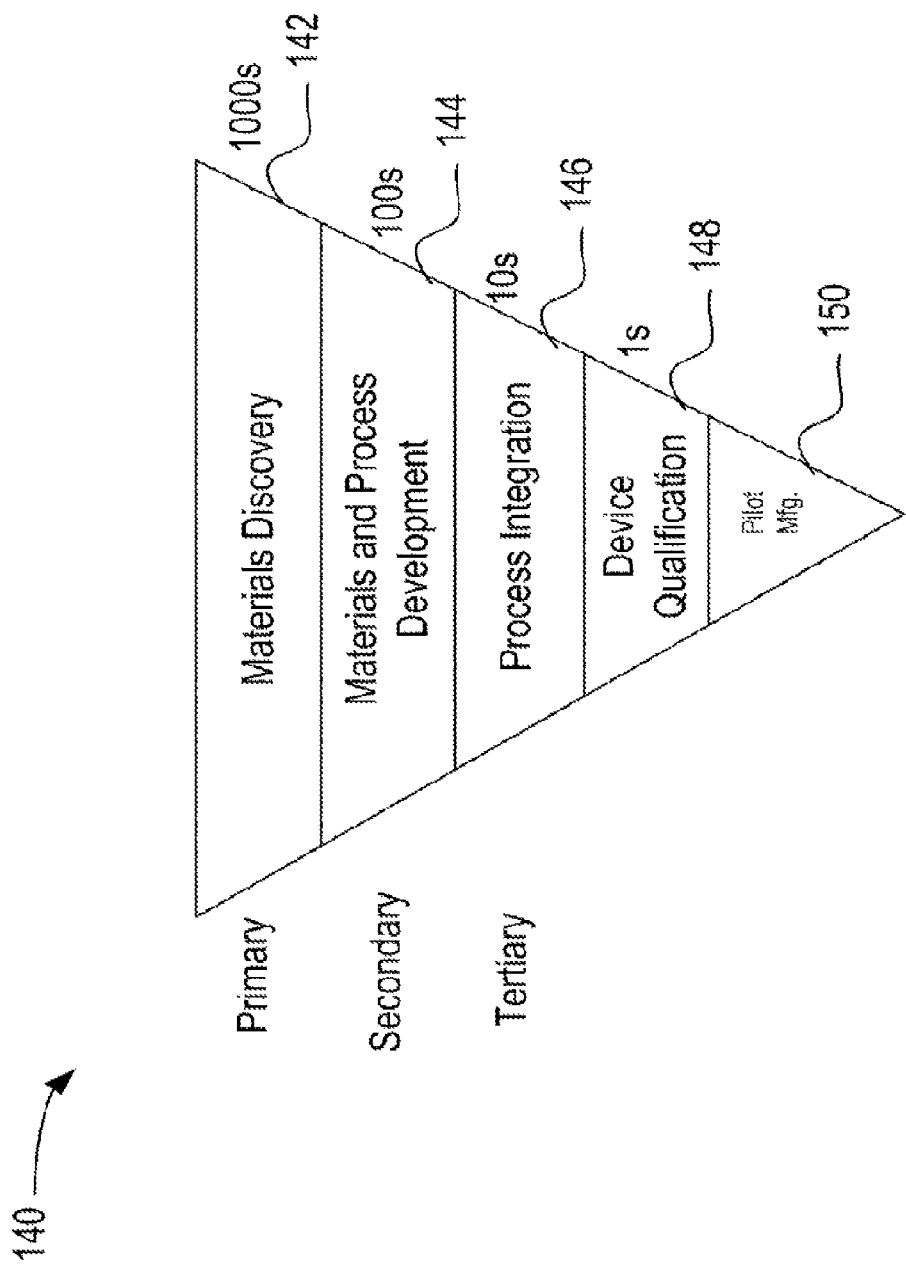
FIG. 1E is a block diagram illustrating an implementation of combinatorial processing and evaluation.

FIG. 1E is a block diagram 140 illustrating an implementation of combinatorial processing and evaluation. The schematic diagram 140 illustrates that the relative number of combinatorial processes run with a group of substrates decreases as certain materials and/or processes are selected. Generally, combinatorial processing includes performing a large number of processes and materials choices during a first screen, selecting promising candidates from those processes, performing the selected processing during a second screen, selecting promising candidates from the second screen, and so on. In addition, feedback from later stages to earlier stages can be used to refine the success criteria and provide better screening results.

For example, thousands of materials are evaluated during a materials discovery stage 142. Materials discovery stage 142 is also known as a primary screening stage performed using primary screening techniques. Primary screening techniques may include dividing wafers into regions and depositing materials using varied processes. The materials are then evaluated, and promising candidates are advanced to the secondary screening stage (i.e., the materials and process development stage 144). Evaluation of the materials is performed using metrology tools such as physical and electronic testers and imaging tools.

The materials and process development stage 144 may evaluate hundreds of materials (i.e., a magnitude smaller than the primary stage) and may focus on the processes used to deposit or develop those materials. Promising materials and processes are again selected, and advanced to the tertiary screening stage (i.e., the process integration stage 146), where tens of materials and/or processes and combinations are evaluated. The tertiary screening stage, or process integration stage 146, may focus on integrating the selected processes and materials with other processes and materials into structures.

The most promising materials and processes from the tertiary screening stage are advanced to the device qualification stage 148. In the device qualification stage 148, the materials and processes selected are evaluated for high volume manufacturing, which normally is conducted on full wafers within production tools, but need not be conducted in such a manner. The results are evaluated to determine the efficacy of the selected materials, processes, and integration. If successful, the use of the screened materials and processes can proceed to the manufacturing stage 150.

The schematic diagram 140 represents an example of various techniques that may be used to evaluate and select materials, processes, and integration for the development of semiconductor devices. The descriptions of primary, secondary, etc. screening and the various stages 142-150 are arbitrary and the stages may overlap, occur out of sequence, be described and be performed in many other ways.

While the preceding description is directed at the implementation of multiple deposition cells 104 in accordance with the present invention, the following description will, in part, describe aspects of a single deposition cell-nebulizer assembly 101. It is contemplated that the following description of components and implementations within the context of a single deposition cell-nebulizer assembly 101 should be interpreted to extend to the multiple deposition cell configuration of the preceding description.

Figure 1F:
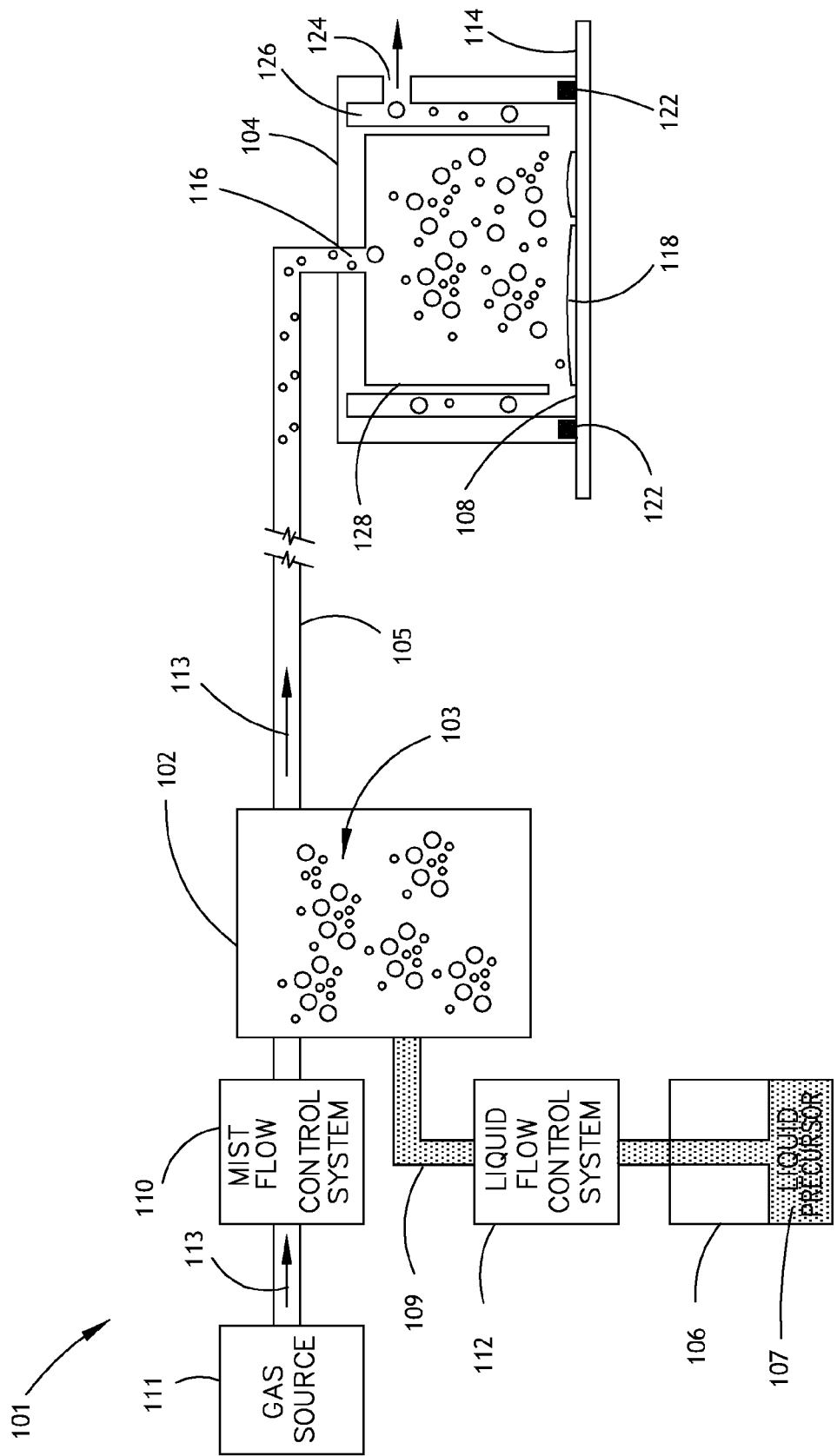
FIG. 1F is a simplified schematic view of a nebulizer-deposition cell assembly of the system for combinatorial site-isolated thin film deposition, in accordance with one embodiment of the present invention.

FIG. 1F illustrates a partial cross-sectional schematic view of a single deposition cell-nebulizer assembly 101 of the system 100 for combinatorial site-isolated thin film deposition in accordance with an exemplary embodiment of the present invention. The single assembly 101 of the system 100 may include a nebulizer 102 configured to convert a selected amount of a liquid precursor 107 from a liquid precursor source 106 to an aerosolized mist 103 of particles (e.g., liquid droplets). The nebulizer 102 may be in fluidic communication with a liquid precursor source 106 allowing for the transportation of a selected amount of the liquid precursor 107 from the liquid precursor source 106 to the nebulizer 102. The nebulizer may be placed in fluidic communication with the liquid precursor source 106 utilizing a source-nebulizer conduit 109. Further, the assembly 101 may include a deposition cell 104 configured to direct the aerosolized mist 103 onto an isolated region 108 of the surface of a substrate 114. The deposition cell 104 may be placed in fluidic communication with the nebulizer 102 utilizing a nebulizer-deposition cell conduit 105 (e.g., laminar flow tube). The aerosolized mist of particles 103 may be transported from the nebulizer 102 to an inlet 116 of the deposition cell 104 through the nebulizer-cell conduit 105 via a gas stream flow 113. Moreover, the deposition cell 104 may be situated in close proximity to or in physical contact with the surface of the substrate 114 in order to allow for the deposition of the aerosolized mist of particles 103 onto an isolated selected region 108 of the substrate 114. After entering the interior of the deposition cell 132, the aerosolized particles 103 may accelerate (e.g., via gravity, fluid forces, or electric field forces) from the top of the deposition cell 104 to the surface of the substrate 114. The deposited particles 103 may then be allowed to coalesce and harden (e.g. via evaporation, curing, annealing, baking, or the like) on the surface of the substrate 114 forming a solid thin film 118 confined to the isolated region 108 of the substrate 114.

In some embodiments, the region 108 may include one region and/or a series of regular or periodic regions preformed on the substrate. The region may have any convenient shape (e.g., circular shape, rectangular shape, elliptical shape, wedge-shaped, or the like). In the semiconductor field, a region may include, but is not limited to, a test structure, a single die, a multiple die, a portion of a die, a defined portion of a substrate, or an undefined area of a blanket substrate, which is defined through the processing.

In some embodiments, the system 100 for combinatorial site-isolated thin film deposition may include one or more liquid flow control systems 112. A liquid flow control system 112 may be utilized to control the flow of a liquid precursor 107 from a liquid source 106 to a nebulizer 102 of the system 100. For example, in a single assembly 101 of the system 101, a liquid flow control system 112 may control the flow of a liquid precursor 107 from a liquid precursor source 106 to a nebulizer 102 through a source-nebulizer conduit 109, such as a plastic tubing (e.g., polyvinyl chloride tubing or polyethylene tubing) conduit or a metal tubing conduit (e.g., aluminum tubing, copper tubing, or brass tubing).

In additional embodiments, one or more liquid flow control systems 112 may include one or more actuated valves configured to control the flow of a liquid precursor 107 from a liquid source 106 to a nebulizer 102. For example, an actuated valve of the liquid control system 112 may be opened allowing the liquid precursor 107 to flow from the liquid precursor source 106 to a liquid inlet of a nebulizer 102. By way of another example, an actuated valve of the liquid control system 112 may be closed, stopping the liquid precursor 107 from flowing from the liquid precursor source 106 to the liquid inlet of a nebulizer 102.

In another embodiment, one or more liquid flow control systems 112 may include one or more pumps. For example, a pump of the liquid control system 112 may be used to transport the liquid precursor 107 from the liquid precursor source 106 to the liquid inlet of the nebulizer 102. For instance, the pump may include a liquid pump used to pump the liquid precursor 107 from the liquid precursor source 106 to a liquid inlet of the nebulizer 102. In another instance, the pump may include a gas pump used to pressurize a sealed container of the liquid precursor 107.

In a further embodiment, one or more liquid control systems 112 may include one or more computer control systems. For example, a computer control system of the liquid control system 112 may be used to control one or more valves or one or more pumps of a liquid control system 112. Moreover, it is further contemplated that a computer control system may include preprogrammed software suitable for providing instructions to the computer system output, which in turn signals the one or more actuated valves or pumps of a liquid control system 112. Additionally, the computer control system 112 may be responsive to an operator input, wherein the computer control system in response to the operator input provides instructions to the computer system output, which in turn signals the one or more actuated valves or pumps of the liquid control system 112. Further, it is also contemplated that the computer control system 112 may be responsive to a signal transmitted by another control system (e.g., mist flow control system 110 or a global control system) of the system 100, wherein the computer control system of the liquid control system 110, responsive to a signal from another control system, provides instructions to the computer system output, which in turn signals the one or more actuated valves or pumps of the liquid control system 112.

It is further contemplated that a global liquid control system may be used to control individual liquid flows in the single assemblies 101 of the system 100. For example, a global liquid control system may be utilized to control a first liquid flow from a first liquid precursor source 106 to a first nebulizer 102, a second liquid flow from a second liquid precursor source 106 to a second nebulizer 102, and a up to and including an Nth liquid flow from an Nth liquid precursor source 106 to an Nth nebulizer 102.

The preceding description of the one or more liquid control systems 112 should not be interpreted as a limitation but rather merely an illustration as it is contemplated that a variety of implementations may be more or less suitable in different contexts.

In some embodiments, the system 100 for combinatorial site-isolated thin film deposition may include one or more mist flow control systems 110. A mist flow control system 110 may be utilized to control the rate at which an aerosolized mist 103 of particles is supplied to a deposition cell 104. For example, in a single assembly 101 of the system 100, one or more mist flow control systems 110 may include one or more actuated valves configured to regulate the gas flow between a gas source 111 and a nebulizer 102. The regulation of gas flow between the gas source 111 and the nebulizer 102 allows for control of the flow of the aerosolized mist of particles 103 to a fluidically coupled deposition cell 104. For example, an actuated gas valve of the mist flow control system 110 may be adjusted in order to adjust the flow rate of the gas stream 113 flowing from the gas source 111 to the nebulizer 102.

In other embodiments, one or more mist flow control systems 110 of the system 100 for combinatorial site-isolated thin film deposition may include one or more electronic mass flow control systems. For example, a mass flow control system of the mist flow control system 110 may be adjusted in order to adjust the flow rate of the gas stream 113 flowing from the gas source 111 to the nebulizer 102.

Figure 1G:
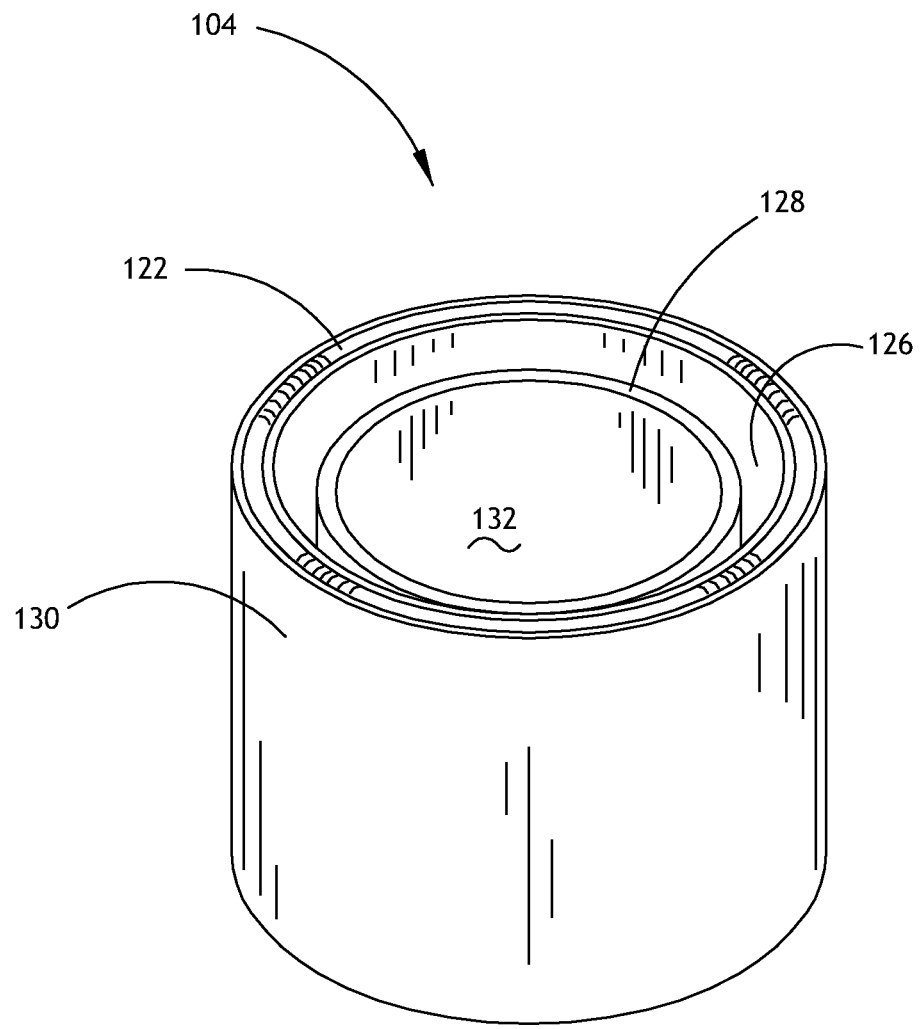
FIG. 1G is a schematic view of a single deposition cell of the system for combinatorial site-isolated thin film deposition, in accordance with one embodiment of the present invention.
Figure 1H:
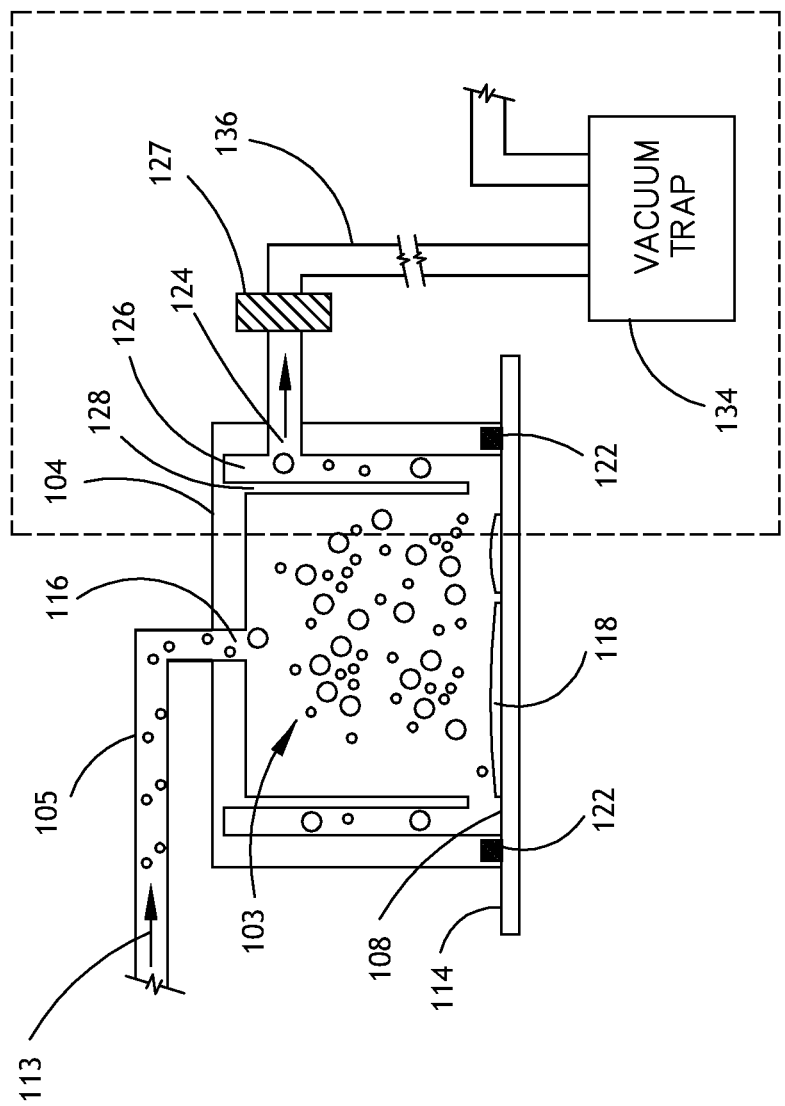
FIG. 1H is a simplified schematic view of a single deposition cell of the system for combinatorial site-isolated thin film deposition illustrating an evacuation system, in accordance with one embodiment of the present invention.

In some embodiments, one or more mist flow control systems 110 of the system 100 for combinatorial site-isolated thin film deposition may include one or more actuated orifices 127, as shown in FIG. 1H. For example, an actuated orifice 127 of an exhaust system 138 may be controlled by the mist flow control system 110 in order to adjust the flow rate of the gas stream 113 flowing from the nebulizer 102 into the deposition cell 104.

In further embodiments, one or more mist flow control systems 110 may include a computer control system configured to control the actuated valves of a mist flow control system 110. For instance, in response to an input instruction from an operator, the computer control system may transmit an electronic signal to one or more actuated valves or a mass flow control system configured to respond (e.g., open or close) to an electronic signal. In another instance, a preprogrammed computer control system may maintain or establish a selected mist flow rate by adjusting one or more actuated valves or one or more mass flow control systems located between the gas source 111 and the nebulizer 102.

Further, one or more mist flow control systems 110 may be configured to control one or more liquid flow control systems 112. For instance, the computer control system of a mist flow control system 110 may transmit instruction signals to one or more liquid flow control system 112 in order to regulate the flow rate of liquid precursor 107 being transported from a liquid source 106 to a nebulizer 102.

It is further contemplated that the computer control system of a mist flow control system 110 may be responsive to a global control system, which is configured to control the various subsystems (e.g., liquid control system(s) 112, mist flow control system(s) 110, or exhaust system(s) 138) of the system 100. Moreover, it is further recognized that the computer control system of one or more liquid flow control systems 112 and the computer control system of one or more of the mist flow control systems 110 may in fact be subsystems of a single computer control system, wherein the computer control system of the liquid flow control system 112 and the computer control system of the mist flow control system 110 are modules of the overall computer control system.

It is further recognized that the rate of flow of the aerosolized mist of particles 103 may be regulated by the flow rate of the gas stream 113 flowing from the gas source 111 to a vacuum trap 134 of an exhaust system 138 of the system 100. Therefore, a mist flow control system 110 may be configured to control a pressure regulator of the vacuum trap 134 allowing for more precise control of the gas steam flow 113 and the flow of the aerosolized mist of particles 103 transported via the gas stream flow 113.

It is further contemplated that a global mist flow control system may be used to control individual mist flows in the single assemblies 101 of the system 100. For example, a global mist flow control system may be utilized to control a first mist flow from a first nebulizer 102 to a first deposition cell 104, a second mist flow from a second nebulizer 102 to a second deposition cell 104, and a up to and including an Nth mist flow from an Nth nebulizer 102 to an Nth deposition cell 104. The preceding description of the one or more mist flow control systems 110 should not be interpreted as a limitation but rather merely an illustration as it is contemplated that a variety of implementations may be more or less suitable in different contexts.

In some embodiments, one or more nebulizer-cells conduit 105 of the system 100 may include a laminar flow element. For example, a nebulizer-cell conduit 105 may include a straight pipe section configured to produce substantially laminar flow in the gas stream 113 carrying the aerosolized mist of particles 103. It should be appreciated by those skilled in the art that the non-turbulent laminar flow that may occur in a nebulizer-cell conduit 105 may allow for more precise control of deposition conditions as the fluid movement of the gas stream 113 is more readily predicted and controlled.

It is further contemplated that in the context of the system 100 for combinatorial site-isolated thin film deposition multiple nebulizer-cell conduits 105 may be implemented. For example, as shown in FIG. 1B, the conduits 105 may be used to fluidically couple a single nebulizer 102 to multiple deposition cells 102. In another example, as shown in FIG. 1C, a conduit 105 may be used to couple a single nebulizer 102 to a single deposition cell 104. Further, as shown in FIG. 1D, a network of conduits 105 may be implemented to fluidically couple emerging gas flows 113 from multiple nebulizers 102, allowing the combined intermixed gas flow to be transported to the individual deposition cells 102 of the system 100.

In some embodiments, the material used to fabricate one or more deposition cells 104 of the system 100 for combinatorial site-isolated thin film deposition may include, but is not limited to, a metal material or a plastic material. For example, a deposition cell 104 of the system 100 for combinatorial site-isolated thin film deposition may include an aluminum deposition cell. By way of another example, a deposition cell 104 of the system 100 for combinatorial site-isolated thin film deposition may include a Teflon deposition cell. In another example, a deposition cell 104 of the system 100 for combinatorial site-isolated thin film deposition may include an acrylic deposition cell. An acrylic deposition cell is particularly advantageous when optical monitoring of the deposition process or subsequent treatment processes is required. Further, UV transparent acrylic may be implemented in situations where the thin film 118 of the deposited mist of aerosolized particles 103 requires further treatment (e.g., UV curing).

Referring now to FIGS. 1F and 1G, one or more deposition cells 104 may include an O-ring 122 configured to create a seal between the deposition cell 104 and an underlying substrate 114. For example, an O-ring 122 may be operably connected to the bottom of the deposition cell 104. For instance, an O-ring 122 may be inserted into a recessed groove that outlines the periphery of the bottom of the deposition cell 104. The deposition cell 104 may then be placed onto a surface of a substrate 114, wherein a seal is formed between the O-ring 122 and the surface of the substrate 114. The seal created by the O-ring 122 about the periphery of the deposition cell 104 results in a region 108 of the substrate 114 isolated from the remainder of the substrate external to the deposition cell 104. The aerosolized mist 103 of particles may then be transported from the nebulizer 102 to the inlet 116 of a deposition cell 104 through a nebulizer-cell conduit 105 via the gas stream 113. The aerosolized particles 103 may then accelerate (e.g., via gravity, fluid forces, or electric field forces) from the top of the deposition cell 104 to the surface of the substrate 114, depositing onto the surface of the substrate 114. The deposited particles 103 may then be allowed to coalesce and harden (e.g. via evaporation, curing, annealing, baking, or the like) on the surface of the substrate 114 forming a solid thin film 118 confined to the isolated region 108 of the substrate 114.

In further embodiments, a deposition cell 104 may be mechanically connected to the underlying substrate 114. For example, a deposition cell 104 may be mechanically connected to an underlying substrate 114 via inertial forces. For instance, a deposition cell 104 may be sufficiently heavy to create an adequate seal between the O-ring 122 of the deposition cell 104 and the surface of substrate 114. By way of another example, the deposition cell 104 may be mechanically connected to the underlying substrate 114 via a clamping mechanism. For instance, a clamp may be used to hold the deposition cell 104 and the underlying substrate 114 in place. In a further example, a deposition cell 104 may be mechanically connected to the underlying substrate 114 via a negative pressure within the deposition cell 104. For instance, a vacuum trap 134 of the system 100 may create a deposition cell 104 pressure that is lower than atmospheric pressure. As a result, there will exist a net force directed inward on the deposition cell 104 acting to hold the deposition cell 104 in place with respect to the surface of the underlying substrate 114.

A variety of substrates may be implemented in accordance with the present invention. For example, the substrate 114 may include, but is not limited to, a silicon substrate, a gallium arsenide substrate, glass, quartz, ruby or the like. The preceding lists of substrate materials should not be considered a limitation as there exists a variety of substrate materials suitable for implementation in accordance with the present invention. In a general sense, a substrate should be interpreted as any object with which a thin film material may be deposited utilizing the present invention.

Further, the substrate 114 may be a conventional round 200 millimeter, 300 millimeter or any other larger or smaller substrate/wafer size. In other embodiments, substrate 114 may be a square, rectangular, or other shaped substrate. One skilled in the art will appreciate that substrate 114 may be a blanket substrate, a coupon (e.g., partial wafer), or even a patterned substrate having predefined regions. In another embodiment, substrate 114 may have regions defined through the processing described herein.

Referring now to FIG. 1H, the system 100 may include one or more exhaust systems 138. For example, an exhaust system 138 of a deposition cell 104 of a single assembly 101 of the system 100 may be utilized to transport remnant exhaust (e.g., non-deposited aerosolized particles 103) from the interior 132 of the deposition cell 104 to a vacuum trap 134 in fluidic communication with the interior 132 of the deposition cell 104. It should also be recognized that the pressure differential created by the vacuum trap 134 may act to maintain the gas stream 113 flow from the gas source 111.

In a further embodiment, an exhaust system 138 of a deposition cell 104 may include one or more exhaust ports 124 configured to allow for the evacuation of exhaust from the inner region 132 of the deposition cell 104 to an external vacuum trap 134. For example, an exhaust port 124 may be located on the wall of a deposition cell 104 and may be fluidically coupled to the vacuum trap 134 via a cell-trap conduit 136, such as plastic (e.g., polyethylene or polyvinyl chloride) tubing or metal (e.g., stainless steel, copper, aluminum, or brass) tubing.

Further, an exhaust system 138 of a deposition cell 104 may include one or more exhaust channels 126. For example, an exhaust channel 126 of a deposition cell 104 may be defined by a wall 128 located within the interior of a deposition cell 104 and extending from the top of the deposition cell 104 towards the bottom of the deposition cell 104, leaving a small gap 127 at the bottom of the cell. The gap 127 at the bottom of the deposition cell allows exhaust gas to pass from the interior 132 of the deposition cell 104 to the exhaust channel 126 of the deposition cell. Moreover, the exhaust channel 126 acts to transport exhaust gas from the interior 132 of the deposition cell 104 to the exhaust port 124 of the deposition cell 104. It should be recognized that the preceding description pertaining to the exhaust system 138 of a single assembly 101 of the system 100 for combinatorial site-isolated thin film deposition should not be interpreted as a limitation but merely as an illustration as other exhaust system arrangements may be more or less suitable in different contexts.

In a further embodiment, an exhaust system 138 may include one or more actuated valves fluidically coupled to an exhaust port 124 of a deposition cell 104 and a vacuum trap 134. For instance, one or more actuated valves may be connected in series between the exhaust port 124 and the vacuum trap 134 along the cell-trap conduit 136.

In another embodiment, an exhaust system 138 may include one or more actuated orifices 127 fluidically coupled to an exhaust port 124 of a deposition cell 104 and a vacuum trap 134. For instance, one or more actuated orifices 127 (e.g., pressure activated orifice) may be connected in series between the exhaust port 124 and the vacuum trap 134 along the cell-trap conduit 136.

In a further embodiment, an exhaust system 138 may include a computer control system configured to control the actuated valves or actuated orifices of the exhaust system 138. For instance, in response to an input instruction from an operator, the computer control system may transmit an electronic signal to one or more actuated valves or one or more orifices configured to respond to an electronic signal. In another instance, a preprogrammed computer control system may maintain or establish a selected exhaust flow rate by adjusting one or more actuated valves or one or more actuated orifices located between the exhaust port 124 and the vacuum trap 134. It is further contemplated that the computer control system may be responsive to a global control system, which is configured to control the various subsystems (e.g., liquid control system 112, mist flow control system 110, or exhaust system 138) of the system 100.

It is further contemplated that in addition to evacuating aerosolized particles 103 from a deposition cell 104, the gas flow created by the pressure differential between a vacuum trap 134 and an interior 132 of the deposition cell 104 may help to facilitate deposition by flowing the aerosolized mist of particles 103 from the deposition cell 104 inlet 116 toward the surface of the substrate 114. It should be recognized by those skilled in the art that the flow of particles 103 created by the net pressure differential between the exhaust channels 127 and the deposition cell 104 inlet 116 is particularly useful in instances where the average particle size of the aerosolized mist of particles is smaller than approximately 100 μm as gravitational acceleration is not typically sufficient to accelerate particles of this size to adequate levels for mist deposition. Moreover, the orifice 127 coupled to the exhaust port 124 of the deposition chamber 104 may be utilized to control the aerosol flow rate into the deposition cell 104. For instance, the mist flow control system 110 may control the orifice 127 thus acting to control the flow of the aerosolized mist of particles 103 into the deposition chamber 103.

Figure 2A:
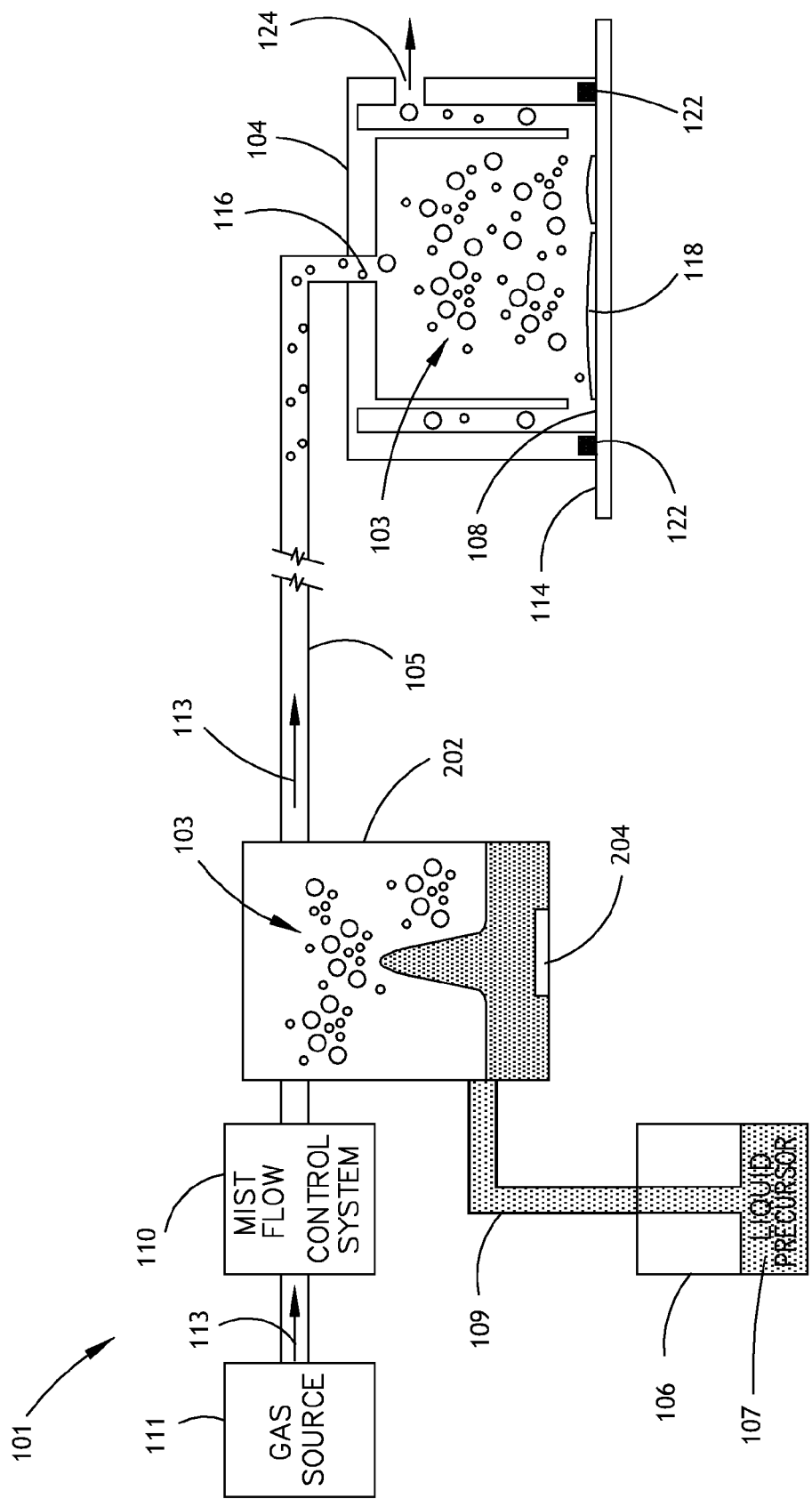
FIG. 2A is a simplified schematic view of a nebulizer-deposition cell assembly of the system for combinatorial site-isolated thin film deposition illustrating an ultrasonic nebulizer, in accordance with one embodiment of the present invention.

Referring now to FIG. 2A, one or more nebulizers 102 of the system 100 for combinatorial site-isolated thin film deposition may include an ultrasonic nebulizer 202. For example, an ultrasonic nebulizer 202 of a single assembly 101 of the system 100 may convert a selected amount of liquid precursor 107 supplied from a liquid precursor source 106 to an aerosolized mist of particles 103. This aerosolized mist of particles 103 may then be transported from the ultrasonic nebulizer 202 to an inlet 116 of one or more deposition cells 104 through one or more nebulizer-cell conduits 105 via a gas stream flow 113.

Further, an ultrasonic nebulizer 202 may include an ultrasonic transducer 204. For example, an ultrasonic transducer 204 (e.g., piezoelectric transducer) of an ultrasonic nebulizer 202 may convert a portion of the liquid precursor 107 contained within the volume of the ultrasonic nebulizer 202 to an aerosolized mist of particles 103. It should be recognized that the ultrasonic transducer 204 creates aerosolized particles 103 by creating capillary waves at the liquid precursor-gas interface and cavitation in the bulk of the liquid precursor 107. This aerosolized mist of particles 103 may then be transported from the ultrasonic nebulizer 202 to an inlet 116 of one or more deposition cells 104 through one or more nebulizer-cell conduits 105 via a gas stream flow 113. Applicants have found that for the liquid precursors 107 tested a gas flow rate between 50 and 1000 mL/min displayed uptake and deposition properties suitable for implementation in the one or more ultrasonic nebulizers 202 of the present invention.

The ultrasonic transducer 204 of one or more ultrasonic nebulizers 202 may include a piezoelectric transducer, such as a piezoelectric crystal. For example, a gold coated piezoelectric crystal, such as a piezoelectric ceramic, may be used to convert a portion of the liquid precursor 107 contained within the volume of the ultrasonic nebulizer 202 to an aerosolized mist of particles 103. It should be recognized that the preceding description of piezoelectric transducers does not represent a limitation, but should be interpreted as an illustration, as a variety of piezoelectric types and materials may be more or less appropriate in different contexts. For most liquid precursors 107 tested, applicants have found that a 2.4 MHz piezoelectric transducer displays liquid-to-aerosolized particle conversion properties suitable for implementation in the one or more ultrasonic nebulizers 202 of the present invention. It should be recognized, however, that the use of a 2.4 MHz transducer is not a limitation but merely an illustration as piezoelectric transducers operating at other frequencies may be more or less appropriate in different contexts.

It is further recognized that the efficiency of aerosolized particle 103 creation may depend on the characteristics of the implemented liquid precursor 107. For instance, the rate a of aerosolized particle 103 production may be related to the liquid precursor viscosity η, surface tension σ, and vapor pressure p by:

$$\alpha \propto \sqrt{\frac{\pi p}{\eta \sigma}} \quad \text{(Eqn. 1)}$$

Therefore, different liquid precursors 107, having different fluid properties, may be aerosolized at different rates, and as such the mass flow rate of the particles 103 carried to one or more deposition cells 104 via the gas stream 113 may depend on the fluid properties of the given liquid precursors.

Figure 2B:
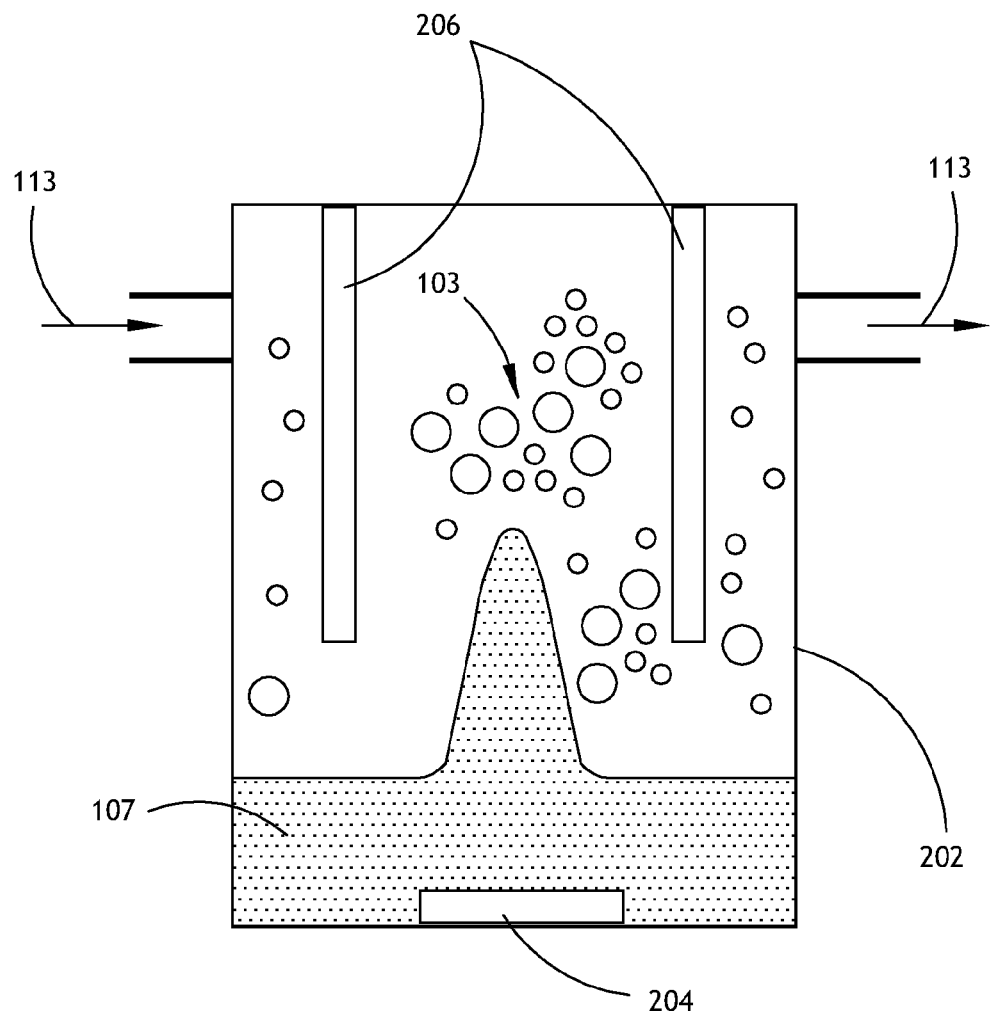
FIG. 2B is a simplified schematic view of an ultrasonic nebulizer equipped with a baffling system, in accordance with one embodiment of the present invention.

Referring now to FIG. 2B, one or more ultrasonic nebulizers 202 may include a baffle 206. For example, a baffle 206 of an ultrasonic nebulizer 202 may be located within an internal cavity of the ultrasonic nebulizer 202. The baffle 206 may act to direct larger particles of the aerosolized mist of particles 103 into the center of the nebulizer 202, where they may be 're-nebulized' and thus further broken apart. This process may result in a reduction in the average particle size of the aerosolize mist of particles 103 emerging from an outlet of the ultrasonic nebulizer 202. This aerosolized mist of particles 103 may then be transported from the ultrasonic nebulizer 202 to an inlet 116 of one or more deposition cells 104 through one or more nebulizer-cell conduits 105 via a gas stream flow 113. Applicants have found that a 1 to 1.25 inch diameter steel tube (outside diameter) located in the internal nebulizing cavity of an ultrasonic nebulizer 202 displays the baffling characteristics suitable for implementation in the present invention.

Figure 3:
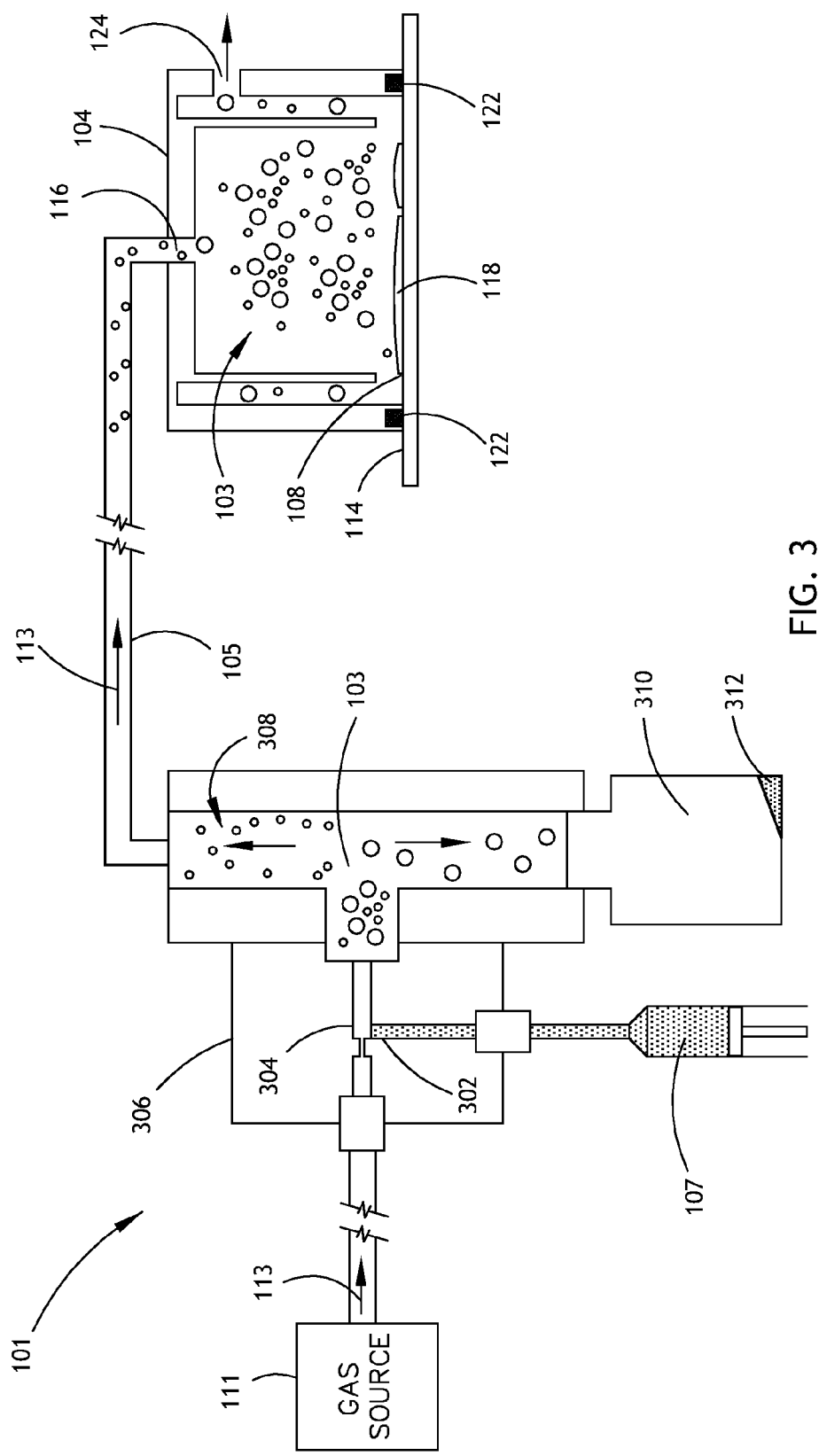
FIG. 3 is a simplified schematic view of a nebulizer-deposition cell assembly of the system for combinatorial site-isolated thin film deposition illustrating a gas jet nebulizer, in accordance with one embodiment of the present invention.

Referring now to FIG. 3, one or more nebulizers 102 of the system 100 for combinatorial site-isolated thin film deposition may include a gas jet nebulizer 301. For example, a jet nebulizer 301 may convert a selected amount of liquid precursor 107 to an aerosolized mist of particles 103. This aerosolized mist of particles 103 may then be transported from the jet nebulizer 301 to an inlet 116 of the deposition cell 104 through a nebulizer-cell conduit 105 via a gas stream flow 113.

One or more jet nebulizers 301 may include a liquid inlet nozzle 302 and a gas inlet nozzle 304. For example, a liquid inlet nozzle 302 (e.g., Cavro syringe) may transport a selected amount of a liquid precursor 107 into an aerosolizing region. Further, the gas inlet nozzle 304 may transport a gas from a gas source into the same aerosolizing region, causing the gas stream 113 to mix with the supplied liquid 107. The energy provided by the gas stream 113 may act to aerosolize the liquid precursor 107, resulting in an aerosolized mist of particles 103. This aerosolized mist of particles 103 may then be transported from the jet nebulizer 301 to an inlet 116 of a deposition cell 104 through a nebulizer-cell conduit 105 via the gas stream flow 113.

Applicants have predicted that for liquid water provided by a Cavro syringe at 0.25 mL/min and a gas stream 113 provided at 3 L/min the Sauter mean diameter for water in a jet nebulizer 301 may be approximately 3 μm. It should be appreciated that the average particle size of the aerosolized particles 103 created in a jet nebulizer 301 is dependent on a number of variables, including but not limited to, gas flow velocity, surface tension of the liquid precursor and the density of the liquid precursor. Therefore, for example, the average particle size of a given aerosolized mist of particles 103 created by a jet nebulizer 301 may be controlled by the velocity of the gas stream 111 flowing out of the gas nozzle 304 into the liquid precursor 107.

In some embodiments, one or more jet nebulizers 301 may include a separating chamber 308. For example, the separating chamber 306 may be arranged to take advantage of the larger gravitational force exerted on larger aerosolized particles 103. For instance, by arranging the separating chamber 306 substantially vertically, with the gas flow 113 arranged so as to travel upwards, an aerosolized particle 103 having insufficient kinetic energy to overcome the gravitational force exerted on the particle will drift in a direction opposite of the gas flow 113. As a result, larger particles lacking the kinetic energy to overcome the gravitational force will tend to be filtered out of the flow of the aerosolized mist of particles 103. The condensed and coalesced material 312 resulting from the separated larger particles may then be collected in a receptacle 310. The remaining aerosolized mist of particles 103 may then be transported from the outlet of the separating chamber 308 of the jet nebulizer 301 to an inlet 116 of a deposition cell 104 through a nebulizer-cell conduit 105 via the gas stream flow 113.

In some embodiments, one or more nebulizers 102 may include an electrospray nebulizer. For example, an electrospray nebulizer may convert a selected amount of liquid precursor 107 to an aerosolized mist of particles 103. This aerosolized mist of particles 103 may then be transported from the electrospray nebulizer to an inlet 116 of a deposition cell 104 through a nebulizer-cell conduit 105 via a gas stream flow 113. It should be recognized by those skilled in the art that a liquid precursor 107 may be converted to a fine aerosolized mist of particles through the application of high voltage to a volume of the liquid precursor 107. Moreover, the size of the aerosolized particles 103 produce by an electrospray nebulizer may be much smaller than aerosolized particle 103 produced via other nebulization processes. For instance, particles sizes for electrospray produced aerosolized particles may be as small as a few nanometers.

Figure 4A:
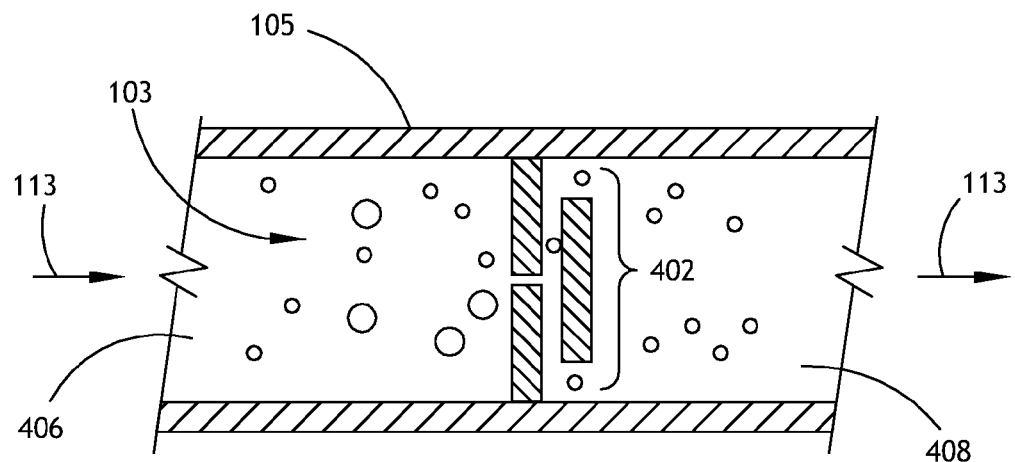
FIG. 4A is a cross-sectional view of an inertial impactor, in accordance with one embodiment of the present invention.
Figure 4B:
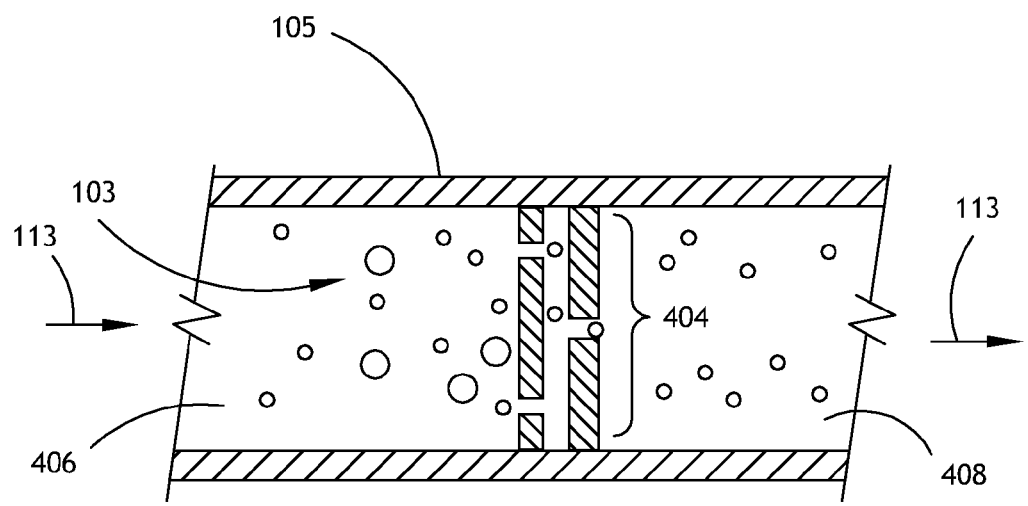
FIG. 4B is a cross-sectional view of an inertial impactor, in accordance with one embodiment of the present invention.

Referring now to FIGS. 4A and 4B, the system 100 for combinatorial site-isolated thin film deposition may include one or more inertial impactors, such as 402 or 404, in fluidic communication with a nebulizer 102 and a deposition cell 104. An inertial impactor 402 may be utilized to filter particles larger than a selected size out of the aerosolize mist of particles 103 transported from the nebulizer 102 to the deposition cell 104 through a nebulizer-cell conduit 105. For example, an inertial impactor 402 of a single assembly 101 of the system 100 may be placed between a nebulizer 102 and a deposition cell 104 by connecting the impactor 402 in the nebulizer-cell conduit 105 such that the aerosolized mist of particles 103 may flow through the impactor 402. For instance, an aerosolized mist of particles 103 may be transported from a nebulizer 102 to an inlet 406 of an inertial impactor 402 via a gas stream 113 flowing through the nebulizer-cell conduit 105. Then larger particles may be inertially filtered out of the transported aerosolized mist of particles 103 as larger particles have a lower probability of traversing an obstacle placed within the flow of the aerosolized mist of particles 103. As a result, by flowing the aerosolized mist of particles 103 through one or more inertial impactors 402 the size distribution of the particles of the aerosolized mist of particles 103 may be shifted to a smaller average size. Upon emerging from the outlet 408 of the inertial impactor 402, the remaining aerosolized mist of particles 103 may be transported to a deposition cell 104 through a nebulizer-cell conduit 105.

By way of another example, an inertial impactor 402 may be connected directly to the outlet 308 of the separating chamber 306 of a jet nebulizer 301. For instance, an aerosolized mist of particles 103 may be transported from the outlet of the separating chamber 306 of a jet nebulizer to an inlet 406 of an inertial impactor 402 via a gas stream 113 flowing through the separating chamber 306. Upon emerging from the outlet 408 of the inertial impactor 402, the remaining aerosolized mist of particles 103 may be transported to a deposition cell 104 through a nebulizer-cell conduit 105 via the gas stream flow 113.

It should be appreciated that the probability of a particle being collected prior to traversing a given impactor opening, such as the openings in the inertial impactors 402 and 404, is dependent upon the Stoke's number for the particle-opening system. The Stoke's number is given by:

$$Stk = \frac{\rho_p C_c d_p^2 U}{9\eta W} \quad \text{(Eqn. 2)}$$

where $\rho_p$ represents the density of the aerosolized particles, $d_p$ represents the size of the aerosolized particles, U represents the average gas velocity, $\eta$ represents the gas viscosity, W represents the impactor opening width, and $C_c$ represents a correction factor dependent upon the gas pressure near the impactor and the particle diameter. It should further be recognized that the collection probability is also a function of the Reynolds number for the system, as well as the width of the impactor opening, the depth of the impactor opening, and the separation between impactor layers. It is further recognized that as the particle collection efficiency of a given impactor may greatly depend on the type of gas used to transport the mist of particles to the deposition cell 104 as well as the average size of the particles 103 transported, the design of a utilized impactor 402 may be tuned so as to increase collection efficiency for a given liquid precursor-gas system.

Moreover, it is further contemplated that multiple impactors 402 may be connected in series so as to increase the probability of collecting larger particles from the aerosolized mist of particles 103. For example, a first impactor 402 and a second impactor 402 may be placed between a nebulizer 102 and a deposition cell 104 by connecting the impactors in a nebulizer-cell conduit 105 such that the aerosolized mist of particles 103 may flow through the first impactor 402 and then through a second impactor 402. The above description should not be interpreted as a limitation but merely as an illustration as it is appreciated that up to and including N number of inertial impactors 402 may be utilized in accordance with the present invention.

Figure 5:
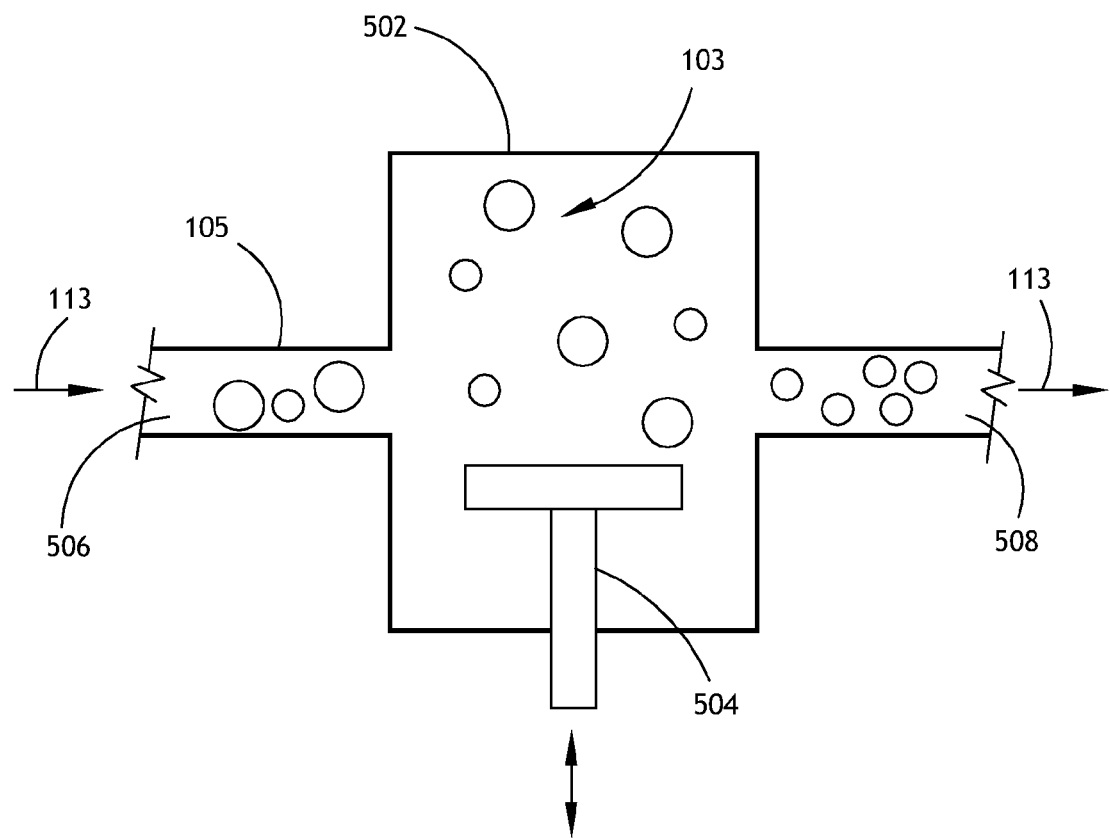
FIG. 5 is a cross-sectional view of an ultrasonic particle refiner, in accordance with one embodiment of the present invention.

Referring now to FIG. 5, the system 100 for combinatorial site-isolated thin film deposition may include one or more ultrasonic particle refiners 502 in fluidic communication with a nebulizer 102 and one or more deposition cells 104. One or more ultrasonic particle refiners 502 may be utilized to reduce the average particle size of the particles of an aerosolized mist of particles 103 transported from a nebulizer 102 to a deposition cell 104 through a nebulizer-cell conduit 105. For example, an ultrasonic particle refiner 502 may be placed between a nebulizer 102 and a deposition cell 104 by connecting the refiner 502 in a nebulizer-cell conduit 105 such that the aerosolized mist of particles 103 may flow through the refiner 502. For instance, an aerosolized mist of particles 103 may be transported from a nebulizer 102 to an inlet 506 of an ultrasonic refiner 502 via a gas stream 113 flowing through a nebulizer-cell conduit 105. Then the average size of the particles in the aerosolized mist of particles 103 may be reduced by the ultrasonic refiner 502. It is believed that the energy imparted to the particles of the aerosolized mist of particles 103 by the ultrasonic transducer 504 (e.g., piezoelectric transducer) of the ultrasonic refiner 502 acts to mechanically break the particles apart. As a result, by flowing the aerosolized mist of particles 103 through one or more ultrasonic particle refiners 502 the size distribution of the particles of the aerosolized mist of particles 103 may be shifted to a smaller average size. Upon emerging from the outlet 508 of the particle refiner 502, the aerosolized mist of particles 103 may then be transported to a deposition cell 104 through the nebulizer-cell conduit 105 via the gas stream 113.

It is further contemplated that multiple ultrasonic particle refiners 502 may be connected in series so as to increase the number of particles of the aerosolized mist of particles 103 that are reduced in size. For example, a first refiner 502 and a second refiner 502 may be placed between a nebulizer 102 and a deposition cell 104 by connecting the refiners 502 in a nebulizer-cell conduit 105 such that the aerosolized mist of particles 103 may flow through the first refiner 502 and then through a second refiner 502. The above description should not be interpreted as a limitation but merely as an illustration as it is appreciated that up to and including N number of ultrasonic particle refiners 502 may be utilized in accordance with the present invention.

Figure 6A:
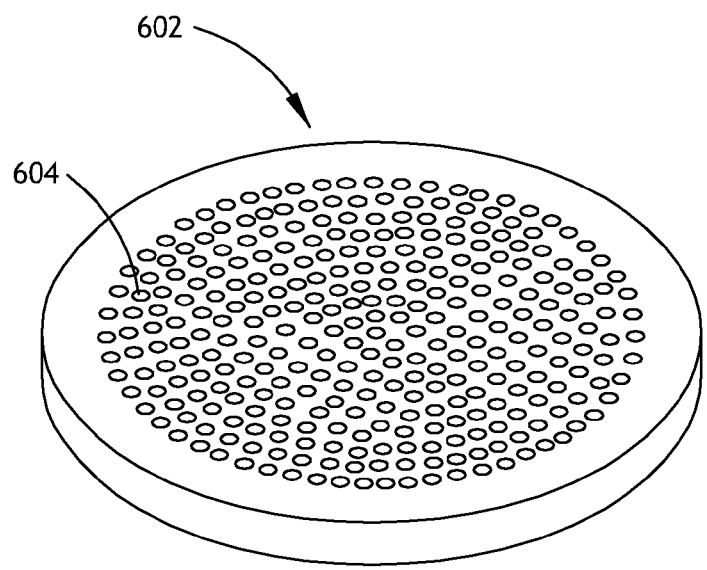
FIG. 6A is a glancing angle schematic view of a showerhead device, in accordance with one embodiment of the present invention.
Figure 6B:
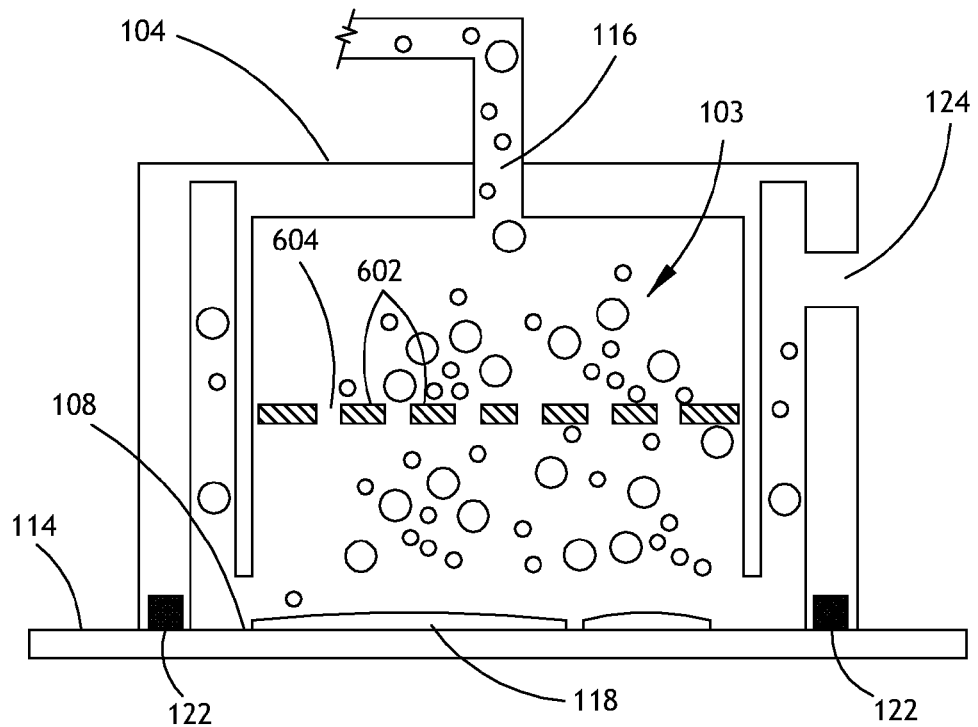
FIG. 6B is a simplified schematic view of a single deposition cell of the system for combinatorial site-isolated thin film deposition illustrating a showerhead device, in accordance with one embodiment of the present invention.

Referring now to FIGS. 6A and 6B, the system 100 for combinatorial site-isolated thin film deposition may include one or more showerhead devices 602 configured to regulate the flow of an aerosolized mist of particles 103. A showerhead device 602 may be utilized to improve the uniform spatial distribution of the particles of an aerosolized mist of particles 103 upon deposition by diffusing the flow of the aerosolized mist of particles 103. For example, in a single assembly 101 of the system 100, an aerosolized mist of particles 103 may be transported from a nebulizer 102 to a showerhead device 602. The particles 103 may then pass through the openings 604 of the showerhead device 602, which act to diffuse the aerosolized mist of particles 103. After passing through the showerhead device 602, the diffused aerosolized mist of particles 103 may then flow from the showerhead device 602 to the surface of a substrate 114, where a portion of the particles 103 may be deposited on the substrate 114 surface.

In a further embodiment, a showerhead device 602 may be arranged substantially parallel to the substrate 114 surface and may be located within an interior 132 of a deposition cell 104. For example, in a single assembly 101 of the system 100, the aerosolized mist of particles 103 may be transported from a nebulizer 102 to the inlet 116 of a deposition cell 104 through a nebulizer-cell conduit 105 via the gas stream 113. After entering the interior of the deposition cell 132, the particles may then pass through the showerhead device 602, aligned substantially parallel with the surface of the substrate 114. The showerhead device 602 acts to diffuse the aerosolized mist of particles 103 prior to deposition onto the substrate 114 surface. Upon emerging from the showerhead device 602, the mist of particles 103 may follow a path substantially perpendicular with respect to the substrate 114 (i.e., path is substantially vertical) before being deposited onto the surface of the substrate 114.

In another embodiment, one or more showerhead devices 602 may include an inlet configured to directly fluidically couple the showerhead device 602 to a nebulizer-cell conduit 105. For example, an aerosolized mist of particles 103 may be transported from a nebulizer 102 to the inlet of a showerhead device 602 through a nebulizer-cell conduit 105 via the gas stream 113. The showerhead device 602 may be arranged to effectively function as the inlet of a deposition cell 104. After entering the inlet of the showerhead device 602 and then passing through the openings 604 of the showerhead device 602, which acts to diffuse the aerosolized mist of particles 103, the aerosolized mist of particles 103 may enter the interior of the deposition cell 132. After entering the interior of the deposition cell 132, the mist of particles 103 may follow a path substantially perpendicular with respect to the substrate (i.e., path is substantially vertical) before being deposited onto the surface of the substrate 114.

In some embodiments, one or more showerhead devices 602 may include a disk shaped showerhead device 602 having a plurality of openings 604 configured to transport the aerosolized mist of particles 103 from the nebulizer side of the showerhead device 602 to the substrate side of the showerhead device 602. It should be appreciated that a variety of showerhead device 602 arrangements may be suitable for implementation in context of the present invention. For instance, the exact number and arrangement of showerhead device openings 604 may depend on the specific application in question. Applicants have found that, in a single assembly 101 of the system 100, a showerhead device 602 having 800 hexagonally arranged openings 604 with a 0.024 inch diameter displays the transport and diffusion properties suitable for implementation in the present invention. It should be recognized, however, that this is not a limitation but merely an illustration as other showerhead device 602 arrangements may be more or less appropriate in different contexts.

In some embodiments, one or more showerhead devices 602 may include a metal showerhead device 602. For example, a showerhead device 602 may include, but is not limited to, an aluminum showerhead device, a brass showerhead device, or a stainless steel showerhead device. For example, in a single assembly 101 of the system 100, an aerosolized mist of particles 103 may be transported from the nebulizer 102 to an aluminum showerhead device. The particles 103 may then pass through the openings 604 of the aluminum showerhead device 602. After passing through the aluminum showerhead device 602, the diffused aerosolized mist of particles 103 may then flow from the aluminum showerhead device 602 to the surface of the substrate 114, where a portion of the particles 103 may be deposited on the substrate 114 surface.

In some embodiments, one or more showerhead devices 602 may include a plastic showerhead device 602. For example, a showerhead device 602 may include, but is not limited to, a polyvinyl chloride (PVC) showerhead device or a polytetrafluoroethylene (PTFE) showerhead device. For example, in a single assembly 101 of the system 100, the aerosolized mist of particles 103 may be transported from the nebulizer 102 to a PVC showerhead device. The particles 103 may then pass through the openings 604 of the PVC showerhead device 602. After passing through the PVC showerhead device 602, the diffused aerosolized mist of particles 103 may then flow from the PVC showerhead device 602 to the surface of the substrate 114, where a portion of the particles 103 may be deposited on the substrate 114 surface. It should be recognized that the preceding description pertaining to material types suitable for implementation in one or more showerhead devices 602 of the present invention is not a limitation but merely an illustration as other showerhead materials may be more or less appropriate in different contexts (e.g., corrosive resistance, electrical conductivity and etc.).

It is further contemplated that the one or more showerhead devices 602 of the system 100 may be located at various distances from the surface of the substrate 114. It should be recognized that different showerhead-substrate distances may be more or less appropriate in different contexts. For instance, when choosing an appropriate distance, the gas flow rate, the specific liquid precursor implemented, the size of the isolated deposition region, the required applied electric field and a variety of other factors may be considered. Applicants have found that, in a single assembly 101 of the system 100, a showerhead-substrate distance between approximately 0.25 and 1.5 inches displays deposition properties suitable for implementation in the present invention. This, however, should not be interpreted as a limitation as it is anticipated that distances outside this range may be suitable in different contexts.

Figure 7:
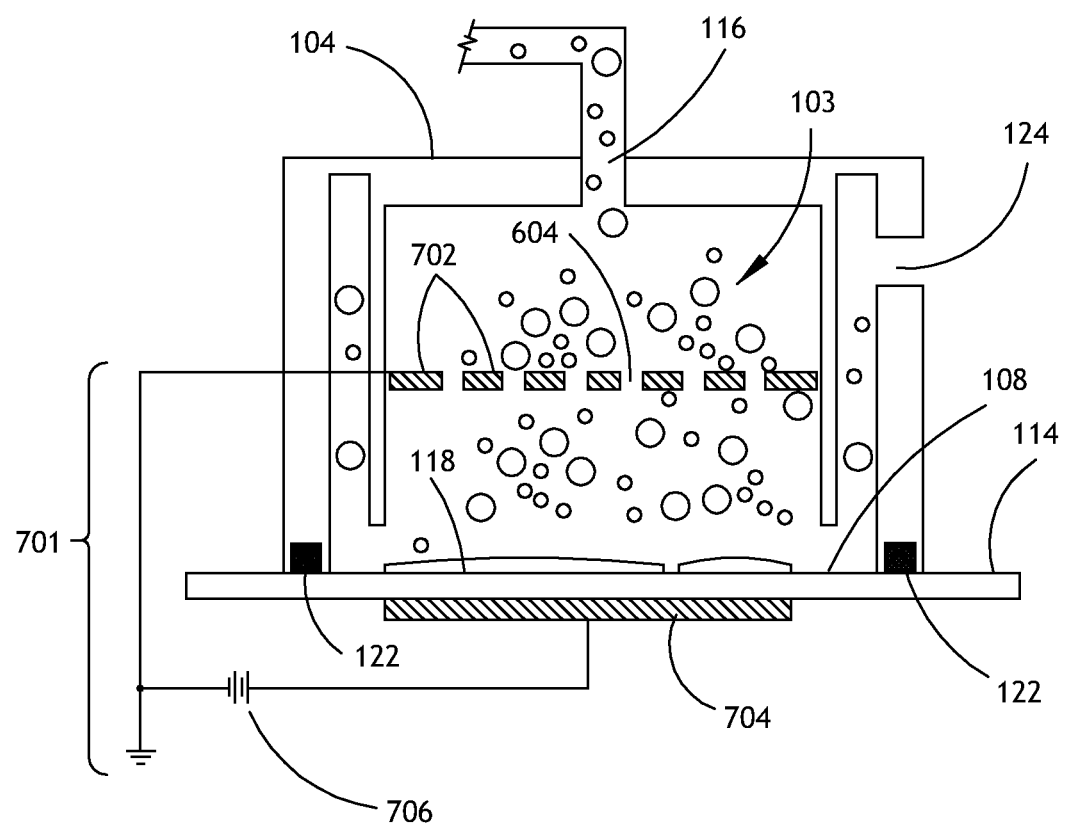
FIG. 7 is a simplified schematic view of a single deposition cell of the system for combinatorial site-isolated thin film deposition illustrating a showerhead device implemented in an electric field particle accelerator, in accordance with one embodiment of the present invention.

Referring now to FIG. 7, the system 100 for combinatorial site-isolated thin film deposition may include one or more electric field particle accelerators 701. It is recognized that for particles sizes below approximately 100 μm the gravitational acceleration of the particles of the aerosolized mist of particles 103 is generally insufficient for mist based deposition. An electric field particle accelerator 701 may be utilized to accelerate charged particles of the aerosolized mist of particles 103 toward the surface of the substrate 114. For example, in a single assembly 101 of the system 100, an aerosolized mist of particles 103 may be transported from the nebulizer 102 to an inlet of an electric field particle accelerator 701. Then charged particles of the aerosolized mist of particles 103 may be accelerated from a first electrode 702 of the particle accelerator 701 to a second electrode 704 of the particle accelerator 701. The accelerated charge particles of the aerosolized mist of particles 103 may then be deposited onto the surface of the substrate surface 114.

In a further embodiment, an electric field particle accelerator may include a first electrode located above the substrate 114 and a second electrode located below the substrate 114. For example, in a single assembly 101 of the system 100, an aerosolized mist of particles 103 may be transported from the nebulizer 102 to an inlet of an electric field particle accelerator 701. Then charged particles of the aerosolized mist of particles 103 may be accelerated from a first electrode 702 located above and oriented substantially parallel to the surface of the substrate 114 toward a second electrode 704 located below and oriented substantially parallel to the surface of the substrate 114. As a result, the charged particles of the aerosolized mist of particles 103 are accelerated along a substantially vertical direction, from the top electrode 702 toward the bottom electrode 704, and then deposited onto the surface of the substrate surface 114.

In a further embodiment, the bottom electrode 704 of a particle accelerator 701 may include an electrically conducting plate operably connected to the bottom side of the substrate 114, while the top electrode 702 may include an electrically conductive showerhead device 702 positioned at a selected distance above the substrate surface. For example, in a single assembly 101 of the system 100, an aerosolized mist of particles 103 may be transported from the nebulizer 102 to an inlet 116 of a deposition cell 104 through a nebulizer-cell conduit 105 via the gas stream 113. After entering the interior of the deposition cell 132, the particles may then pass through the showerhead electrode device 702, aligned substantially parallel with the surface of the substrate 114, by passing through one or more openings 604 in the showerhead electrode device 702. Upon emerging from the electrode showerhead device 702 of the particle accelerator 701, the electrically charged particles of the mist of particles 103 may then be accelerated from the electrode showerhead device 702 toward the bottom electrode 704 operably connected to and substantially parallel with the bottom side of the substrate 114. As a result, the charged particles of the aerosolized mist of particles 103 may be accelerated along a substantially vertical direction, from the top electrode showerhead device 702 toward the bottom electrode 704, and then deposited onto the surface of the substrate surface 114.

A voltage range necessary for sufficient acceleration using the electric field accelerator 701 may be between 0 and 10 kV. This should not be interpreted as a limitation but merely an illustration as it is anticipated that a different range of voltages may be appropriate in different contexts. For example, the necessary voltage applied across the first electrode 702 and the second electrode 704 may depend on the distance between electrodes, the size of droplets, and the gas flow rate required.

It should be appreciated by those skilled in the art that nebulization itself results in charging a portion of the aerosolized mist of particles 103. The charging of particles of the aerosolized mist of particles 103 occurs primarily in two ways. First, particles are charged as a result of the nebulization process in that the energy used to aerosolize a given liquid precursor 107 is sufficient to strip electrons from a portion of the aerosolized particles. Second, particles are also charged via collisions that occur between the aerosolized particles after nebulization. After being charged, the charged particles may then be accelerated using the electric field accelerator 701 in accordance with the preceding description.

Figure 8:
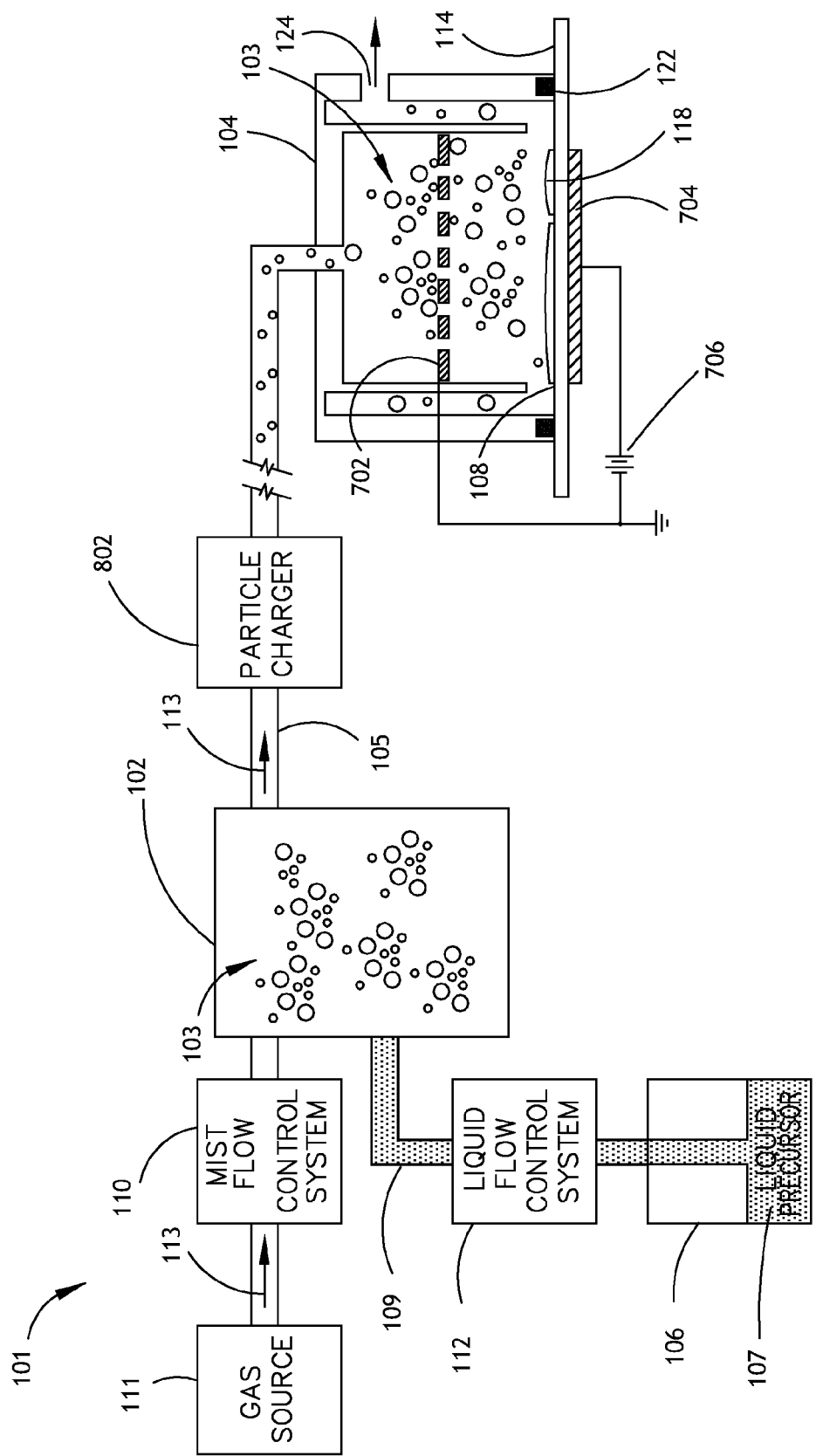
FIG. 8 is a simplified schematic view of a nebulizer-deposition cell assembly of the system for combinatorial site-isolated thin film deposition illustrating a particle charger, in accordance with one embodiment of the present invention.

Referring now to FIG. 8, the system 100 for combinatorial site-isolated thin film deposition may include one or more particle chargers 802. For example, the particle charger 802 may include, but is not limited to, an electrostatic particle charger configured to strip electrons from a portion of the aerosolized mist of particles 103. For instance, in a single assembly 101 of the system 100, the aerosolized mist of particles 103 may be transported from a nebulizer 102 to an inlet of an electrostatic particle charger 802, which is located along a nebulizer-cell conduit 105. After the particles 103 are flowed into the charger 802 inlet, a portion of the aerosolized mist of particles 103 may be charged and then transported out of the electrostatic particle charger via the gas stream 113. Then the aerosolized mist of particles 103, including charged and uncharged particles, may be transported from the outlet of the particle charger 802 to an inlet of an electric field particle accelerator 701. The charged particles may then be accelerated using the electric field accelerator 701 in accordance with the preceding description.

It should also be recognized by those skilled in the art that the uncharged particles of the aerosolized mist of particle 103 will also be accelerated by the application of an electric field by the electric field particle accelerator 701. While the charged particles will be directly accelerated by the electric field between the first and second electrodes, collisions between the uncharged particles and the accelerated charged particles will result in an average net acceleration in the downward vertical direction for both the charged and uncharged particles.

It is further contemplated that after deposition of an aerosolized mist of particles 103 onto the surface of the substrate 114 the deposited aerosolized mist particles may be further treated to form or further condition the thin film(s) 118. For example, the various treatments that may be applied to the deposited mist particles include, but are not limited to, annealing, curing (e.g., UV treatment or thermal treatment), evaporating, baking, doping or electrically poling. It should be recognized that these treatments should not be interpreted as limitations but merely illustrations as a number of alternative treatment process may be applied in accordance with the present invention.

While the present disclosure has described a process and system for combinatorial site-isolated thin film deposition in the context of vertical deposition of an aerosolized mist of particles onto a substrate 114 surface, it is further contemplated that the object of the present invention may be achieved via horizontal mist deposition. For example, the inlet 116 of the deposition cell 104 may be positioned on the deposition cell 104 such that the aerosolized mist of particles 103 carried via the gas stream 113 may impinge on the substrate in a generally parallel manner.

Referring now to FIG. 9, a method 900 for combinatorial site-isolated thin film deposition is described in accordance with the present disclosure. It is contemplated that the method described below may be carried out utilizing the system 100 described in the present disclosure. The method 900 for combinatorial site-isolated thin film deposition includes providing 902 a liquid precursor 107. Then, the method 900 includes converting 904 a portion of the liquid precursor 107 to an aerosolized mist of particles 103. For example, a nebulizer 102 (e.g., an ultrasonic nebulizer 202 or a gas jet nebulizer 301) may convert a portion of the liquid precursor to an aerosolized mist of particles 103. Next, the method 900 includes transporting 906 a first portion of the aerosolized mist of particles to a first deposition cell 104 configured to direct a portion of the aerosolized mist of particles to a first selected region 108 of the surface of the substrate 114. For example, the gas stream 113 regulated by the mist flow control system 110 may transport a first portion of the aerosolized mist of particles 103 from the nebulizer 102 to an inlet 116 of the first deposition cell 104. Then, the method 900 includes transporting 908 at least one additional portion of the aerosolized mist of particles to at least one additional deposition cell 104 configured to direct a portion of the aerosolized mist of particles to at least one additional selected region 108 of the surface of the substrate 114. For example, the gas stream 113 regulated by the mist flow control system 110 may transport a second portion of the aerosolized mist of particles 103 from the nebulizer 102 to an inlet 116 of a second deposition cell 104. Next, the method 900 includes depositing 910 a portion of the transported first portion of the aerosolized mist of particles 103 onto the first selected region 108 of the surface of the substrate 114. For example, after the aerosolized mist of particles 103 enter the interior 132 of the first deposition cell 104 the aerosolized mist of particles 103 may be accelerated (e.g., gravitationally accelerated, electrically accelerated, or fluidically accelerated) toward the substrate surface 114, ultimately impinging the substrate surface 114. Then, the method 900 includes depositing 912 a portion of the transported at least one additional portion of the aerosolized mist of particles 103 onto the at least one additional selected region 108 of the surface of the substrate 114. For example, after the aerosolized mist of particles 103 enter the interior 132 of the at least one additional deposition cell 104 the aerosolized mist of particles 103 may be accelerated (e.g., gravitationally accelerated, electrically accelerated, or fluidically accelerated) toward the substrate surface 114, ultimately impinging the substrate surface 114.

Referring now to FIG. 10, a method 1000 for combinatorial site-isolated thin film deposition is described in accordance with the present disclosure. It is contemplated that the method described below may be carried out utilizing the system 100 described in the present disclosure. The method 1000 for combinatorial site-isolated thin film deposition includes providing 1002 a first liquid precursor 107 and providing 1004 at least one additional liquid precursor 107 (e.g., a second, third, or up to and including an Nth liquid precursor 107). Then, the method 1000 includes converting 1006 a portion of the first liquid precursor to a first aerosolized mist of particles and converting 1008 a portion of the at least one additional liquid precursor to at least one additional aerosolized mist of particles. For example, a first nebulizer 102 (e.g., an ultrasonic nebulizer 202 or a gas jet nebulizer 301) may convert a portion of the first liquid precursor 107 to a first aerosolized mist of particles 103, while a second nebulizer 102 may convert a portion of the second liquid precursor 107 to a second aerosolized mist of particles 103. Next, the method 1000 includes transporting 1010 a portion of the first aerosolized mist of particles to a first deposition cell configured to direct the portion of the first aerosolized mist of particles to a first selected region 108 of the surface of the substrate 114. For example, the gas stream 113 regulated by the mist flow control system 110 may transport a portion of the first aerosolized mist of particles 103 from the first nebulizer 102 to an inlet 116 of the first deposition cell 104. Then, the method 1000 includes transporting 1012 a portion of the at least one additional aerosolized mist of particles to at least one additional deposition cell 104 configured to direct the portion of the at least one additional aerosolized mist of particles to at least one additional selected region 108 of the surface of the substrate 114. For example, the gas stream 113 regulated by the mist flow control system 110 may transport a portion of a second aerosolized mist of particles 103 from a second nebulizer 102 to an inlet 116 of a second deposition cell 104. Next, the method 1000 includes depositing 1014 a portion of the transported portion of the first aerosolized mist of particles onto the first selected region of the surface of the substrate. For example, after the first aerosolized mist of particles 103 enter the interior 132 of the first deposition cell 104 the first aerosolized mist of particles 103 may be accelerated (e.g., gravitationally accelerated, electrically accelerated, or fluidically accelerated) toward the substrate surface 114, ultimately impinging the substrate surface 114. Then, the method 1000 includes depositing 1016 a portion of the transported portion of the at least one additional aerosolized mist of particles onto the at least one additional selected region of the surface of the substrate. For example, after a second aerosolized mist of particles 103 enters the interior 132 of a second deposition cell 104 the second aerosolized mist of particles 103 may be accelerated toward the substrate surface 114, ultimately impinging the substrate surface 114.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Although particular embodiments of this invention have been illustrated, it is apparent that various modifications and embodiments of the invention may be made by those skilled in the art without departing from the scope and spirit of the foregoing disclosure. Accordingly, the scope of the invention should be limited only by the claims appended hereto.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed:

1. An apparatus for combinatorial site-isolated thin film deposition, comprising:
    a source of a first liquid precursor;
    a source of at least one additional liquid precursor;
    a first nebulizer configured to convert a portion of the first liquid precursor to a first aerosolized mist of particles;
    at least one additional nebulizer configured to convert a portion of the at least one additional liquid precursor to at least one additional aerosolized mist of particles;
    a first deposition cell configured to direct a portion of the first aerosolized mist of particles onto a first selected region of a surface of a substrate by isolating the first selected region of the surface of the substrate; and
    at least one additional deposition cell configured to direct a portion of the at least one additional aerosolized mist of particles onto at least one additional selected region of the surface of the substrate by isolating the at least one additional selected region of the surface of the substrate.

2. The apparatus for combinatorial site-isolated thin film deposition of claim 1, further comprising: a mist flow control system configured to control a flow of the first aerosolized mist of particles to the first deposition cell or the at least one additional aerosolized mist of particles to the at least one additional deposition cell.

3. The apparatus for combinatorial site-isolated thin film deposition of claim 1, further comprising: a liquid flow control system configured in fluidic communication to control a flow of the liquid precursor from the source of at least one of the liquid precursors to at least one of the nebulizers.

4. The apparatus for combinatorial site-isolated thin film deposition of claim 1, wherein at least one of the nebulizers comprises: an ultrasonic nebulizer.

5. The apparatus for combinatorial site-isolated thin film deposition of claim 1, wherein at least one of the nebulizers comprises: a gas jet nebulizer.

6. The apparatus for site-isolated thin film deposition of claim 1, wherein at least one of the nebulizers comprises: an electrospray nebulizer.

7. The apparatus for combinatorial site-isolated thin film deposition of claim 1, further comprising: an inertial impactor configured to substantially filter particles larger than a selected size out of at least one of the aerosolized mists of particles, the inertial impactor in fluidic communication with at least one of the nebulizers and at least one of the first deposition cell or the at least one additional deposition cell.

8. The apparatus for combinatorial site-isolated thin film deposition of claim 1, further comprising: an ultrasonic particle refiner configured to reduce an average size of particles in at least one of the aerosolized mists of particles, the ultrasonic particle refiner in fluidic communication with at least one of the nebulizers and at least one of the first deposition cell or the at least one additional deposition cell.

9. The apparatus for combinatorial site-isolated thin film deposition of claim 1, further comprising:
a showerhead device located within at least one of the first deposition cell or the at least one additional deposition cell,
wherein the showerhead device is configured to regulate flow of at least one of the aerosolized mists of particles onto the surface of the substrate,
the showerhead device in fluidic communication with at least one of the nebulizers.

10. The apparatus for combinatorial site-isolated thin film deposition of claim 1, further comprising:
an electric field particle accelerator configured to accelerate charged particles of at least one of the aerosolized mists,
the electric field particle accelerator including a first electrode and a second electrode,
the first electrode located above the substrate,
the second electrode located beneath the substrate.

11. The apparatus for combinatorial site-isolated thin film deposition of claim 10, wherein the first electrode comprises: an electrically conductive showerhead device located within the at least one of the first deposition cell or the at least one additional deposition cell, the electrically conductive showerhead device in fluidic communication with at least one of the nebulizers.

12. The apparatus for combinatorial site-isolated thin film deposition of claim 10, wherein the second electrode comprises: an electrically conductive plate operably connected to a surface of the substrate.

13. The apparatus for combinatorial site-isolated thin film deposition of claim 1, further comprising:
a particle charger configured to electrically charge particles of at least one of the aerosolized mists,
the particle charger located between at least one of the nebulizers and an electric field particle accelerator.

14. The apparatus for combinatorial site-isolated thin film deposition of claim 1, wherein at least one of the first deposition cell or the at least one additional deposition cell includes an O-ring seal configured to create a seal between at least one of the first deposition cell or the at least one additional deposition cell and the surface of the substrate.

15. The apparatus for combinatorial site-isolated thin film deposition of claim 1, further comprising: an exhaust system configured to transport exhaust out of at least one of the first deposition cell or the at least one additional deposition cell.

* * * * *